United States Patent
Miyamoto et al.

(10) Patent No.: US 6,709,801 B2
(45) Date of Patent: Mar. 23, 2004

(54) INFORMATION RECORDING MEDIUM

(75) Inventors: Makoto Miyamoto, Ome (JP); Yoshihiro Ikari, Moriya (JP); Tamotsu Fuchioka, Moriya (JP); Hitoshi Watanabe, Ishige (JP); Reiji Tamura, Moriya (JP); Junko Ushiyama, Kokubunji (JP); Keikichi Andoo, Musashino (JP); Yumiko Anzai, Ome (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 176 days.

(21) Appl. No.: 09/767,835

(22) Filed: Jan. 24, 2001

(65) Prior Publication Data

US 2001/0016242 A1 Aug. 23, 2001

(30) Foreign Application Priority Data

Jan. 26, 2000 (JP) ........................ 2000-021757

(51) Int. Cl.⁷ .................................................. G11B 7/24
(52) U.S. Cl. .................. 430/270.13; 430/945; 428/64.4; 369/275.2; 369/275.5; 369/275.4
(58) Field of Search ............................ 430/270.13, 945; 369/275.5, 275.2, 275.4; 428/64.4

(56) References Cited

U.S. PATENT DOCUMENTS

| 5,395,669 A | * | 3/1995 | Kawahara et al. | ........... 430/945 |
| 5,453,346 A | * | 9/1995 | Kawahara et al. | ........... 430/945 |
| 5,645,909 A | * | 7/1997 | Kobayashi et al. | ........... 430/945 |
| 5,912,103 A | * | 6/1999 | Ebina et al. | ........... 430/270.13 |
| 5,914,214 A | * | 6/1999 | Ohta et al. | .............. 430/270.13 |
| 6,071,587 A | * | 6/2000 | Yoshinari et al. | ....... 430/270.13 |
| 6,153,063 A | * | 11/2000 | Yamada et al. | .......... 369/275.5 |
| 6,203,877 B1 | * | 3/2001 | Okubo | .................... 430/270.13 |
| 6,296,915 B1 | * | 10/2001 | Yusu et al. | ............. 430/270.13 |
| 6,416,837 B1 | * | 7/2002 | Kojima et al. | ......... 430/270.13 |

FOREIGN PATENT DOCUMENTS

| EP | 0897177 | * | 2/1999 |
| JP | 05-101442 | * | 4/1993 |
| JP | 5-144082 | | 6/1993 |
| JP | A-6-338064 | | 12/1994 |
| JP | A-10-228676 | | 8/1998 |

OTHER PUBLICATIONS

Machine translation of JP 10–228676.*
S.Maita et al., proceedings of the 5th Phase Change Recording Research Symposium, pp. 9–14.

* cited by examiner

Primary Examiner—Martin Angebranndt
(74) Attorney, Agent, or Firm—Antonelli, Terry, Stout & Kraus, LLP

(57) ABSTRACT

A high-density information recording medium free from lowering the reflectance by over-write of a large number of times and exfoliation defect in a structure for suppressing cross-erase. This medium includes, over a substrate having a groove shape, a recording layer, and three-layered thin films of a first interference layer, a second interference layer and an interface layer having mutually different compositions and disposed on a laser beam incidence side of the recording layer in order named from the laser beam incidence side. The first interference layer has a smaller refractive index and a larger thermal conductivity than the second interference layer, the interface layer is interposed between the second interference layer and the recording layer, and a distance between the first interference layer and the recording layer is greater than at least a groove depth.

6 Claims, 12 Drawing Sheets

FIG. 2
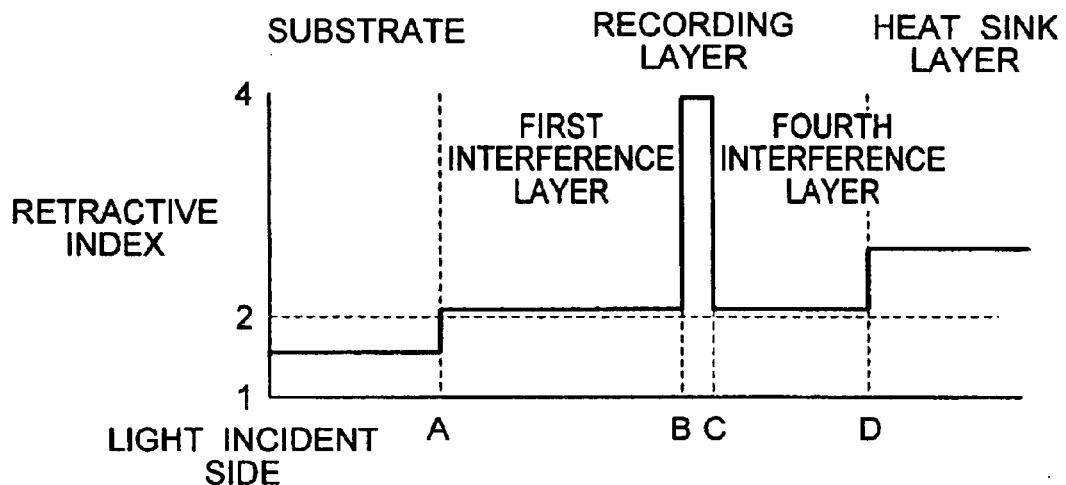
(1) STRUCTURE 1
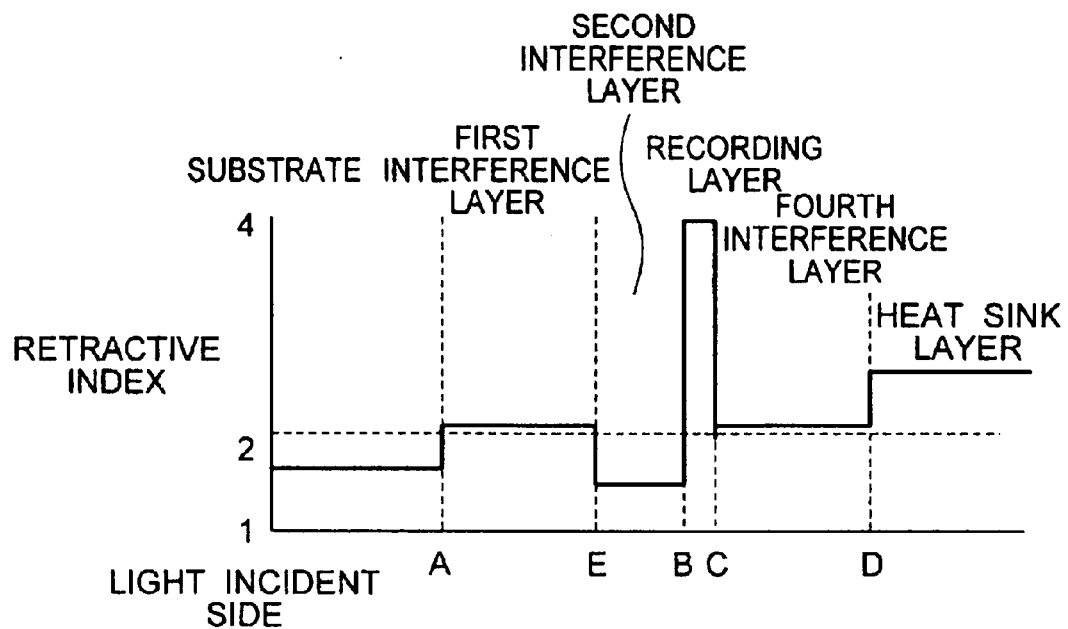
(2) STRUCTURE 2

FIG. 15

| | REFRACTIVE INDEX | THERMAL CONDUCTIVITY | THICKNESS | INTERFERENCE LAYER | REFLECTANCE | CROSSERASE | EXFOLIATION DEFECT |
|---|---|---|---|---|---|---|---|
| STRUCTURE A | n1>n2 | k1>k2 | d2+ds>dg | APPLY | ◎ | ◎ | ◎ |
| STRUCTURE B | n1<n2 | k1>k2 | d2+ds>dg | APPLY | × | ○ | ○ |
| STRUCTURE C | n1>n2 | k1<k2 | d2+ds>dg | APPLY | ○ | × | ○ |
| STRUCTURE D | n1<n2 | k1<k2 | d2+ds>dg | APPLY | × | ○ | ○ |
| STRUCTURE E | n1>n2 | k1>k2 | d2+ds>dg | NOT APPLY | ○ | ○ | × |
| STRUCTURE F | n1<n2 | k1>k2 | d2+ds>dg | NOT APPLY | × | × | × |
| STRUCTURE G | n1>n2 | k1<k2 | d2+ds>dg | NOT APPLY | ○ | × | × |
| STRUCTURE H | n1<n2 | k1<k2 | d2+ds>dg | NOT APPLY | × | × | ○ |
| STRUCTURE I | n1>n2 | k1>k2 | d2+ds<dg | APPLY | ○ | × | ○ |
| STRUCTURE J | n1<n2 | k1>k2 | d2+ds<dg | APPLY | × | × | ○ |
| STRUCTURE K | n1>n2 | k1<k2 | d2+ds<dg | APPLY | ◎ | ◎ | ◎ |
| STRUCTURE L | n1<n2 | k1<k2 | d2+ds<dg | APPLY | × | ○ | ○ |
| STRUCTURE M | n1>n2 | k1>k2 | d2+ds<dg | NOT APPLY | ○ | × | × |
| STRUCTURE N | n1<n2 | k1>k2 | d2+ds<dg | NOT APPLY | × | × | × |
| STRUCTURE O | n1>n2 | k1<k2 | d2+ds<dg | NOT APPLY | ○ | ○ | × |
| STRUCTURE P | n1<n2 | k1<k2 | d2+ds<dg | NOT APPLY | × | ○ | × |

○ : GOOD
× : NO GOOD n1: REFRACTIVE INDEX OF FIRST INTERFERENCE LAYER
n2: REFRACTIVE INDEX OF SECOND INTERFERENCE LAYER
k1: THERMAL CONDUCTIVITY OF FIRST INTERFERENCE LAYER
k2: THERMAL CONDUCTIVITY OF SECOND INTERFERENCE LAYER
d2: THICKNESS OF SECOND INTERFERENCE LAYER
ds: THICKNESS OF INTERFACE LAYER
dg: GROOVE DEPTH

FIG. 16

| DISK | | DISK A | DISK B | DISK C | DISK D | DISK E |
|---|---|---|---|---|---|---|
| FIRST INTERFERENCE LAYER | MATERIAL | ZnS-SiO2 | ZnS-SiO2 | ZnS-SiO2 | SiO4 | ZnS-SiO2 |
| | RETRACTIVE INDEX | 2.16 | 2.16 | 2.16 | 2.2 | 2.16 |
| | THERMAL CONDUCTIVITY | 0.5W/mk | 0.5W/mk | 0.5W/mk | 0.5W/mk | 0.5W/mk |
| | THICKNESS | 100nm | 60nm | 100nm | 95nm | 90nm |
| SECOND INTERFERENCE LAYER | MATERIAL | Al2O3 | Al2O3 | Al2O3 | SiO2 | Si3N4 |
| | RETRACTIVE INDEX | 1.65 | 1.65 | 1.65 | 1.55 | 2.2 |
| | THERMAL CONDUCTIVITY | 11W/mk | 11W/mk | 11W/mk | 2W/mk | 5W/mk |
| | THICKNESS | 35nm | 70nm | 35nm | 40nm | 45nm |
| FIRST INTERFACE LAYER | MATERIAL | Cr2O3 | Cr2O3 | — | Cr2O3 | Cr2O3 |
| | THICKNESS | 2nm | 2nm | — | 2nm | 2nm |
| REFLECTANCE | | 22% | 19.5% | 23% | 23.5% | 14% |
| CROSS-ERASE | | OK | NG | OK | NG | OK |
| EXFOLIATION DEFECT | | OK | OK | NG | OK | OK |
| NORMALIZED REFLECFANCE AFTER 10,000 TIMES OVER-WRITE | | 0.95 | 0.93 | 0.96 | 0.94 | 0.94 |
| TOTAL QUALITY | | ○ | × | × | × | × |

INFORMATION RECORDING MEDIUM

BACKGROUND OF THE INVENTION

1. Field of the Invention

This invention relates to an information recording medium for recording information by irradiation of a laser beam. More particularly, this invention relates to optical disks capable of recording information and typified by phase change type optical disks such as DVD-RAM and DVD-RW, magneto-optic disks such as MD and MO and write-once type optical disks such as DVD-R.

In this specification, the information recording medium is sometimes referred to as the "phase change optical disk", the "magneto-optic disk" or merely the "optical disk". However, the present invention can be applied to those types of information media that record information by generating heat by irradiating a laser beam and using this heat to cause a change in atomic configuration or a magnetic moment. For this reason, the present invention can be effectively applied to information recording media other than disk-like media, such as optical cards, without being particularly limited to the shapes of the information recording media.

The laser beam, too, will be called sometimes "laser light" or merely "light". As described above however, the present invention uses a laser beam capable of generating heat on the information recording medium. Therefore, the effects of the present invention can be obtained so long as the laser beam can provide a multiple interference effect provided by a plurality of interference layers having mutually different refractive indices. Though the present invention is invented by using a red laser (having a wavelength of 645 to 660 nm) but is not particularly dependent on the wavelength of the laser. Therefore, the present invention exhibits its effects for high-density optical disks using laser having a relatively short wavelength such as blue laser and ultraviolet laser.

2. Description of the Related Art

Recently, phase change optical disks such as 2.6 GBDVD-RAM have been put on the market by utilizing their feature of high compatibility with reproduction-only optical disks such as DVD-ROM, DVD-Video, and so forth. However, the 2.6 GBDVD-RAM has not yet satisfied sufficiently the requirements of users in the aspect of its recording capacity, and hopes have been laid on 4.7 GBDVD-RAM and 4.7 GBDVD-RW. Since these phase change optical disks are equivalent to DVD-Video in the recording capacity, they are expected to accomplish optical disks for recording images that replace VTR.

However, many problems remain yet to be solved in order to accomplish the 4.7 GBDVD-RAM. Among others, suppression of cross-erase is a critical problem.

Generally, when a track pitch of an information recording medium is contracted to about 80% of a laser beam spot, leak of reproduction signals from adjacent information recording tracks occurs. Leak of the reproduction signals from the information recorded to the adjacent information recording tracks is referred to as "cross-talk". A land-groove recording system that follows has been developed to solve this problem.

Dimples (groove shapes) are formed on a plastic substrate of a rewritable optical disk for tracking of a laser beam, and information is generally recorded to recesses or protuberances. To improve the recording density (narrower track pitch), however, a system that records the information to both recesses and protuberances has been developed in recent years. The recess and the protuberance of the dimple are called the "groove" and the "land", respectively. Generally, when the track pitch of the information recording medium is narrowed to about 80% of the laser beam spot and the information is recorded to both land and groove, leak of a reproduction signal occurs from an adjacent information recording track (from the groove to the land and vice versa). When the information recorded to the land is reproduced, for example, the reproduction signal from the information recorded to the groove leaks and the information recorded to the land cannot be reproduced accurately.

To solve this problem, JP-A-6-338064 (hereinafter called the "reference 1") teaches to set the groove depth to $\lambda/7$ to $\lambda/5$ (where $\lambda$ is a laser wavelength) in the land-groove recording system. This system has the feature in that even when the track pitch is narrowed to about 60% of the track pitch, cross-talk (leak from the adjacent information recording track) can be cancelled.

On the other hand, S. Maita et al "Erasable Phase Change Optical Disks for Recording at Low Linear Velocity (II)", Proceedings of the $5^{th}$ Phase Change Recording Research Symposium, pp9–14 (hereinafter called the "reference 2") describes a method of improving reflectance. This method disposes a $ZnS$—$SiO_2$ layer and a $SiO_2$ layer having mutually different refractive indices on an energy beam incidence side of a recording layer and improves reflectance by a multiple interference effect.

SUMMARY OF THE INVENTION

The reference 1 does not sufficiently take into consideration a phenomenon (so-called "cross-erase") in which a recording mark recorded to an adjacent information recording track (an adjacent groove in recording to a land or an adjacent land in recording to a groove) is erased. For instance, a distance between a recording layer and a heat sink layer (reflecting layer) is as small as 18 nm in the reference 1. Therefore, it has been found that heat diffuses into an adjacent information recording track through the heat sink layer during recording of information and cross-erase is likely to occur (problem 1).

To solve this problem, Japanese Patent Application No. 10-285008 as a prior application to the present application (but, Applicants do not intend to admit the prior application as the prior art therein.) describes that the distance between the recording layer and the heat sink layer must be greater than at least the groove depth. When the recording layer and the heat sink layer are spaced apart from each other to such an extent that cross-erase can be sufficiently suppressed (at least 65 nm when a laser wavelength is about 645 to about 660 nm), however, another problem develops in that reflectance drops due to the optical interference effect (problem 2).

To improve reflectance, the method described in the reference 2 may be utilized, in principle. However, since the recording layer and $ZnS$—$SiO_2$ keep mutual contact in this method, the sulfur (S) element in the $ZnS$—$SiO_2$ layer diffuses into the recording layer and invites the drop of reflectance when recording is repeatedly conducted thousands of times (problem 3).

To avoid the lowering of reflectance, JP-A-10-228676 describes a method that interposes an interface layer formed of a dielectric compound having a high melting point such as $SiO_2$ or $Al_2O_3$ between a recording layer and a $ZnS$—$SiO_2$ dielectric protective layer. Nonetheless, it has been clarified that when a high temperature humidification test is conducted in this method, exfoliation develops between the recording layer and the interface layer (problem 4).

This exfoliation can be suppressed by using a dielectric material of a Cr—O type, a Ge—N type, etc, in place of the high melting point dielectric compound such as $Al_2O_3$, $SiO_2$, etc, described in aforementioned JP-A-10-285008. However, the inventors of the present invention have found out that though these Cr—O and Ge—N type materials are resistant to exfoliation, they absorb a laser beam and eventually lower reflectance (similar problem to the problem 2). In this case, the problem can be suppressed to a certain extent when the film thickness of the interface layer is reduced. It has been further clarified, however, that when the film thickness of the interface layer is below 5 nm, diffusion of the S atoms from the $ZnS$—$SiO_2$ dielectric protective layer cannot be suppressed sufficiently (the occurrence of the problem 3).

When the technologies of the references 2 and 3 are combined, thin films of four layers, in all, exist on the laser beam incidence side of the recording layer, and the total number of thin films is undesirably great from the aspect of production. Furthermore, the references 1, 2 and 3 do not sufficiently take cross-erase into consideration. When the track pitch is narrowed, cross-erase develops depending on the film thickness of each layer (similar problem to the problem 1).

It is therefore an object of the present invention to clarify, and to provide, a structure of an information recording medium that satisfies all of suppression of cross-erase (counter-measure to the problem 1), improvement of reflectance (counter-measure to the problem 2), suppression of the lowering of reflectance when over-write is made a large number of times (counter-measure to the problem 3) and suppression of exfoliation defect (counter-measure to the problem 4).

The following information recording media may be used to solve the problems of the prior art technologies described above.

(1) An information recording medium for recording information through a change of atomic configuration and/or a change of an electron state upon irradiation of a laser beam, including at least a substrate having a groove shape of a groove depth dg, a recording layer having a shape reflecting the groove shape and thin films of three layers of a first interference layer, a second interference layer and a first interface layer having mutually different compositions, and disposed in order named from a laser beam incidence side of the recording layer, wherein: thermal conductivity of the first interference layer is smaller than thermal conductivity of the second interference layer, and a refractive index of the second interference layer is smaller than refractive indices of the first interference layer and the recording layer; a first interface layer is interposed between the second interference layer and the recording layer while keeping contact with the recording layer; and a distance between the first interference layer and the recording layer is not greater than the value dg.

Reflectance can be improved when the refractive index of the first interference layer is greater than that of the second interference layer as will be explained in detail in the later-appearing embodiment.

Here, the first interference layer preferably has a greater refractive index than that of a material existing on a laser beam incidence side of the first interference layer while keeping contact with the first interference layer. Generally, the material existing on the laser beam incidence side of the first interference layer is a plastic substrate such as a polycarbonate or an organic material such as a UV-setting resin. The refractive indices of these materials are from about 1.4 to about 1.6. To effectively reflect light between the organic material and the first interference layer, the refractive index of the first interference layer is preferably at least 2.0. A concrete and referred example is a mixture of $ZnS$ and $SiO_2$ because the mixture can accomplish a high refractive index of 2.0 or more, a film formation rate is high, noise is not generated and thermal conductivity is extremely low.

The refractive index of the second interference layer is not greater than 2.0, preferably 1.8 or below. Therefore, the second interference layer preferably contains an oxide having a low refractive index such as $SiO_2$, $Al_2O_3$, $MgO$, or the like, because the refractive index is extremely low.

The inventors of the present invention have found out that the second interference layer formed of such a low refractive index oxide is likely to peel from the recording layer. To suppress this exfoliation, a first interface layer may be sandwiched between the recording layer and the second interference layer. Because the first interface layer exists while keeping contact with the recording film, its melting point is higher than at least the melting point of the recording layer. A preferred material of the first interface layer has high adhesion between the recording layer and the second interference layer.

The present inventors have further found out that an oxide or nitride of a transition metal or a nitride of a semiconductor element such as Ge or Si, that are likely to turn to non-amorphous compounds, has high adhesion, but because they are the non-amorphous compound, free electrons exist in them and light absorption resulting from the free electrons lower reflectance.

However, when the first interference layer, the second interference layer and the first interface layer are combined with one another, the demerit of each layer described above can be offset, and the present invention can obtain an information recording medium that can satisfy all of suppression of cross-erase, improvement of reflectance, suppression of the lowering of reflectance in many-times over-write and exfoliation defect.

As will be explained later in detail in the later-appearing embodiment, the present inventors have found out also that because thermal conductivity of the low refractive index compound such as $SiO_2$, $Al_2O_3$, $MgO$, etc, used for the second interference layer is greater than that of the compound such as $ZnS$—$SiO_2$ used for the first interference layer, heat diffuses into the adjacent track and cross-erase becomes likely to occur. The present inventors have found out that this problem can be solved when the distance between the first interference layer and the recording layer is set to a value smaller than the groove depth dg.

An optimum value exists for the composition of each layer, as represented by the following information recording medium.

(2) An information recording medium for recording information through a change of atomic configuration and/or a change of an electron state upon irradiation of a laser beam, including at least a substrate having a groove shape of a groove depth dg, a recording layer having a shape reflecting the groove shape and thin films of three layers of a first interference layer, a second interference layer and a first interface layer having mutually different compositions and disposed in order named from a laser beam incidence side of the recording layer; wherein the first interference layer is formed of a mixture of $ZnS$ and $SiO_2$, that has an amount of $ZnS$ within the range of 50 to 95%, and when the sum of the amounts of O, N, S and C in the second interference layer is X, an amount of O is at least 50% of X and the sum of the amounts of Al, Si and Mg is at least 70% of 1−X; the first interface layer is interposed between the second interference layer and the recording layer, keeps contact with the recording layer, and is formed of an oxide or nitride of a transition metal, or a nitride of Si and Ge, or a mixture containing these members; and a distance between the first interference layer and the recording layer is not greater than the value dg.

The construction described above is effective particularly when reflectance drops due to the optical interference effect. In other words, this construction is effective when reflectance is inevitably sacrificed in order to solve the thermal problem such as cross-erase. Speaking more concretely, it is effective for the construction in which a heat sink layer is disposed on the opposite side to the laser beam incidence side of the recording layer and the distance between the heat sink layer and the recording layer is greater than the groove depth dg.

The heat sink layer disposed on the opposite side to the laser beam incidence side of the recording layer is effective for causing heat generated in recording to rapidly escape and for suppressing damage of the recording layer, as will be explained in detail in the later-appearing embodiment. However, the problem occurs in that heat diffusing into the heat sink layer reaches the adjacent track and causes cross-erase. This problem can be solved when a layer having lower thermal conductivity (third interference layer) than that of the heat sink layer is interposed between the recording layer and the heat sink layer and the distance between the recording layer and the heat sink layer is set to a value greater than the groove depth dg, as will be represented later. Nonetheless, reflectance drastically drops in this construction.

Even in such a situation, the constructions of (1) and (2) can suppress the drop of reflectance.

Consequently, a practical low cross-erase medium having high reflectance can be accomplished as will be described below.

(3) An information recording medium described in (1) and (2) described above, which further includes at least one heat sink layer on an opposite side to the laser beam incidence side of the recording layer, and at least one third interference layer between the recording layer and the heat sink layer, and wherein a distance between the recording layer and the heat sink layer is greater than the value dg.

It has been found that an optimum composition exists for the third interference layer as represented in the following paragraph (4).

(4) An information recording medium as described in (3), wherein the third interference layer is formed of a mixture of ZnS and $SiO_2$ having an amount of ZnS of 50 to 95%.

When such a composition is used, the problem occurs in that the S atoms contained in the third interference layer diffuse into the recording layer during many-times overwrite and lower reflectance. In such a case, a second interface layer may be interposed between the recording layer and the third interference layer as described in (5). The interface layer material used for the second interface layer is preferably the oxide or nitride of the transition metal or the nitride of the semiconductor elements such as Ge or Si, in the same way as the material of the first interface layer. However, these materials absorb readily light as described above, and they are likely to impede the multiple interference effect and to lower reflectance. In such a case, too, the construction described in (1) and (2) can suppress the lowering of reflectance. Needless to say, it is important in this case that the amount of the S element contained in the second interface layer is smaller than that of the S element contained in the third interference layer as described in (5).

(5) An information recording medium as described in (4), wherein a second interface layer exists between the third interference layer and the recording layer while keeping contact with the recording layer, and the amount of the S element contained in the second interface layer is smaller than that of the S element of the third interference layer.

When land-groove recording is conducted as described in (6), cross-erase becomes a particular problem. In this case, too, an information recording medium having extremely low cross-erase can be accomplished by using the construction described in (3).

(6) An information recording medium described in (3), which conducts information recording both into the groove (groove) and between the grooves (land).

Incidentally, the first interface layer, the second interface layer and the recording layer are generally extremely thin such as several nm. Therefore, there is the case where these layers do not always have a laminar shape but their films exist in spots in the island shape (formation of the thin films in the island shape). However, such spots of the films can be optically neglected as long as the distance between the island-like thin films is about ¹⁄₁₀ of the wavelength of the laser beam, and the effects of the present invention are not lost by assuming that a layer having a mean film thickness of the island-like thin film exists. Even when the interface layer such as the second interface layer exists in the island form, for example, the effect of preventing the diffusion of each interference element into the recording layer can be obtained, though not sufficiently. The main object of the first interface layer is to prevent exfoliation occurring between the second interference layer and the recording layer. As to the first interface layer, therefore, there is no problem at all even when it exists in the island shape so long as the material used for the second interface layer does not easily diffuse into the recording layer.

BRIEF DESCRIPTION OF THE DRAWINGS

FIG. 2 is a conceptual view useful for explaining the principle of the present invention;

FIG. 15 is a table showing characteristics of various structures through observation; and FIG. 16 is a table showing altogether characteristics of various structures in trial production.

DESCRIPTION OF THE EMBODIMENTS

The present invention will be explained in detail with reference to the following embodiments thereof.

Figure 1:
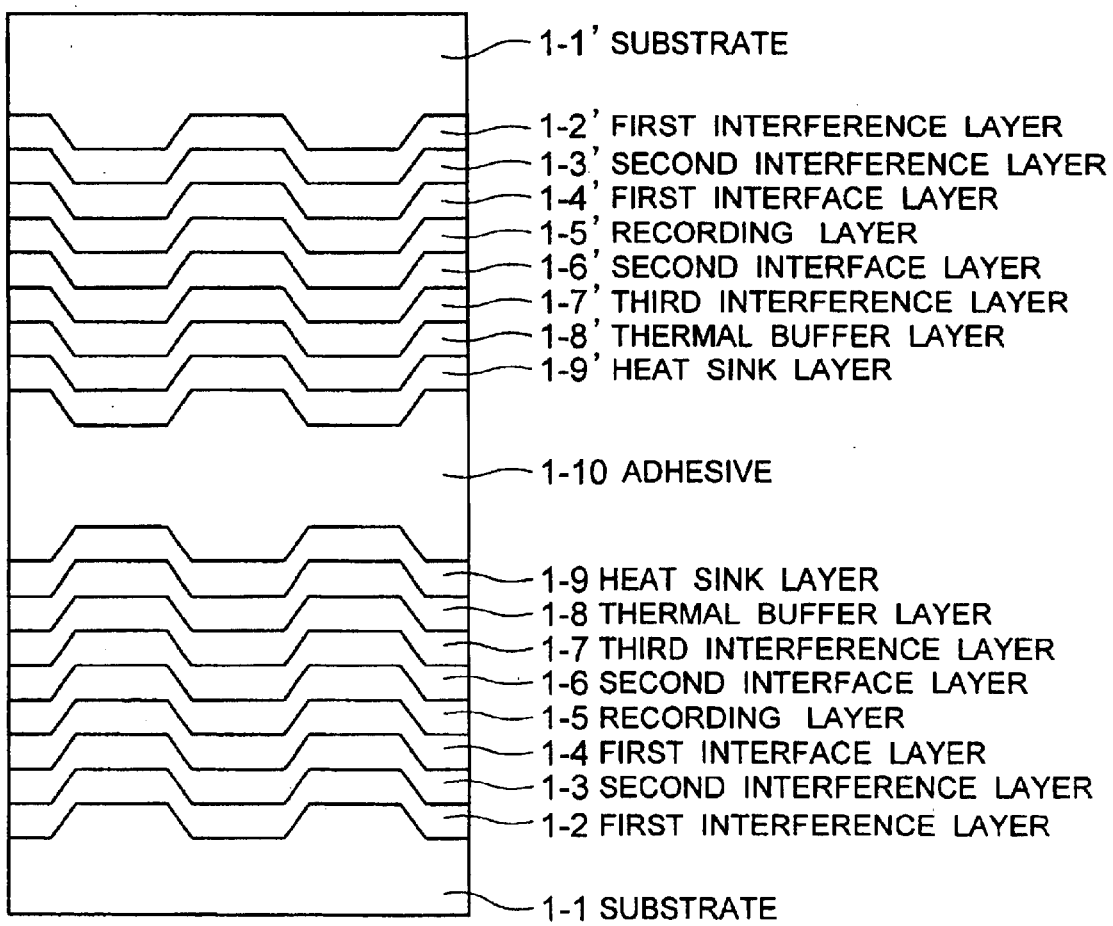
FIG. 1 is a structural view of an information recording medium according to the present invention.

FIG. 1 shows a basic construction of an information recording medium according to the present invention. A first information recording member has a construction wherein a first interference layer 1-2, a second interference layer 1-3, a first interface layer 1-4, a recording layer 1-5, a second interface layer 1-6, a third interference layer 1-7, a thermal buffer layer 1-8 and a heat sink layer 1-9 are serially laminated over a substrate 1-1 provided with groove-like information recording tracks. Another information recording member having the same construction is bonded through an adhesive 1-10.

The substrate 1-1 uses a plastic transparent substrate such as a polycarbonate. Generally, the refractive index of such a transparent substrate is from about 1.5 to about 1.6. The first interference layer 1-2 must have optical characteristics such that its refractive index is greater than that of the substrate 1-1 and is preferably at least 2.0. According to this difference of refractive indices, reflection of light develops between the substrate 1-1 and the first interference layer 1-2, and an optical interference effect utilizing this reflection can increase the change of reflectance between an un-recorded portion (crystal portion) and a recorded portion (amorphous portion).

The refractive index of the second interference layer 1-3 is smaller than that of the first interference layer 1-2 and is smaller than that of the recording layer 1-5, too. The first interface layer 1-4 suppresses exfoliation between the recording layer 1-5 and the second interference layer 1-3. The refractive index of the first interface layer 1-4 is preferably as close as possible to the refractive index of the second interference layer 1-3. When this refractive index is great and almost equal to the refractive index of the fist interference layer 1-2, however, the first interface layer 1-4 is preferably as thin as possible within the range where the exfoliation suppression effect described above is not adversely affected.

The third interface layer 1-7 must have an appropriate film thickness so that the heat sink layer 1-9 can be spaced apart by a suitable distance from the recording layer 1-5 and cross-erase can be controlled. The film thickness is at least 35 nm and is preferably greater than the groove depth. Thermal conductivity of the third interference layer 1-7 must be low to a suitable extent. The second interface layer 1-6 mainly has the role of suppressing exfoliation occurring between the recording layer 1-5 and the third interference layer 1-7 and suppressing the diffusion of the third interference layer elements into the recording layer. The thermal buffer layer 1-8 controls the absorption factors when the recording layer 1-5 is crystalline and amorphous, respectively, and controlling also the heat flow from the recording layer 1-5 to the heat sink layer 1-9. Materials are preferably used that preferably have optical constants (n, k) within the range of $1.4<n<4.5$ and $-3.5<k<0.5$, particularly preferably $2<n<4$ and $-3.0<k<-0.5$. The heat sink layer 1-9 rapidly diffuses heat occurring in the recording layer 1-5 and suppresses thermal damage of the recording layer 1-5 during recording. Therefore, the heat sink layer 1-9 must have high thermal conductivity and a film thickness of at least 30 nm.

Next, the basic concept of the present invention will be described. For the sake of simplicity, however, the explanation will be given by using only the first interference layer, the second interference layer, the recording layer, the third interference layer and the heat sink layer that are of particular importance. FIG. 2 schematically shows the refractive index of each layer when the second interference layer exists and when it does not, respectively. The ordinate represents the refractive index and the abscissa does the distance from a certain point inside the substrate in a direction of incidence of light. Here, the term "structure 1" means the structure that is obtained by serially laminating the first interference layer, the recording layer, the third interference layer and the reflecting layer over the substrate. In this structure, a multiple interference effect that utilizes four reflecting surfaces is used for the optical design. The four reflecting surfaces are a reflecting surface A between the substrate and the first interference layer, a reflecting surface B between the first interference layer and the recording layer, a reflecting surface C between the recording layer and the third interference layer and a reflecting surface D between the third interference layer and the heat sink layer. The optical paths that can be utilized in this case for the optical design are six kinds. They are A–B, A–C, A–D, B–C, B–D and C–D. In contrast, when the second interference layer having a smaller refractive index than that of the first interference layer is interposed between the first interference layer and the recording layer (structure 2), the reflecting surface E that can be utilized for multiple interference adds afresh to the former. In this case, the optical paths that can be utilized for the optical design are 10 kinds, i.e. A–B, A–C, A–D, A–E, B–C, B–D, B–E, C–D, C–E and D–E. In consequence, freedom of design can be drastically improved. Furthermore, when reflection of reflecting surface E is utilized effectively, the reflectance can be easily improved.

The refractive index of the second interference layer is preferably smaller than that of the first interference layer for the following two reasons. First, because the refractive index of the substrate must satisfy various characteristics required for the substrate, materials that can be selected for the substrate are limited. The refractive index of the substrate is from about 1.5 to about 1.6. To increase the reflection coefficient on the reflecting surface A, it is necessary to either increase or decrease as much as possible the refractive index of the first interference layer. When the fact that the refractive indices of ordinary inorganic dielectric materials are at least about 1.4 is taken into consideration, it is not realistic to decrease the refractive index of the first interference layer. In other words, the refractive index of the first interference layer must be greater as much as possible than that of the substrate. However, materials having a refractive index of 2.5 or above in general well absorb light and realistically, the refractive index of the first interference layer is limited to about 2 to about 2.2. Similarly, to increase the reflection coefficient on the reflecting surface E, it is necessary to either increase or decrease the refractive index of the second interference layer to a value greater or smaller than that of the first interference layer. When the refractive index of the second interference layer is greater than the refractive index of the first interference layer, two problems develop. The first is that a transparent material having a refractive index of 3 or more, for example, is extremely difficult to obtain. The second is that the difference of the refractive index becomes small between the recording layer (having a refractive index of about 4) and the second interference layer. As a result, the reflection coefficient on the reflecting surface B becomes small. For this reason, the refractive index of the second interference layer is preferably smaller than the refractive index of the first interference layer. The first interface layer is necessary for mainly suppressing exfoliation that otherwise develops between the recording layer and the second interference layer. The refractive index of the first interface layer is preferably as close as possible to the refractive index of the second interference layer. When the refractive index of the first interface layer is great and approximate to that of the first interference layer, the film thickness is as small as possible within the range where no adverse influences are exerted on the exfoliation suppression effect described above.

Next, the optical calculation result is given below.

The optical constants (n, k) used for the calculation are as follows.

| | |
|---|---|
| First interference layer: | (2.16, 0.00) |
| Second interference layer: | (1.4 to 2.2, 0.00) |
| First interface layer: | (2.6, −0.09) |
| Recording layer (crystal): | (4.57, −5.46) |
| Recording layer (amorphous): | (4.51, −2.22) |
| Second interface layer: | (2.6, −0.09) |
| Third interference layer: | (2.16, 0.00) |
| Thermal buffer layer: | (4.09, −2.88) |
| Heat sink layer: | (1.84, −5.74) |

The film thickness of each layer is as follows.

| | |
|---|---|
| First interference layer: | 0 to 150 nm |
| Second interference layer: | 0 to 80 nm |
| First interface layer: | 1 nm |
| Recording layer: | 6.3 nm |
| Second interface layer: | 10 nm |
| Third interference layer: | 45 nm |
| Thermal buffer layer: | 35 nm |
| Heat sink layer: | 60 nm |

Figure 3:
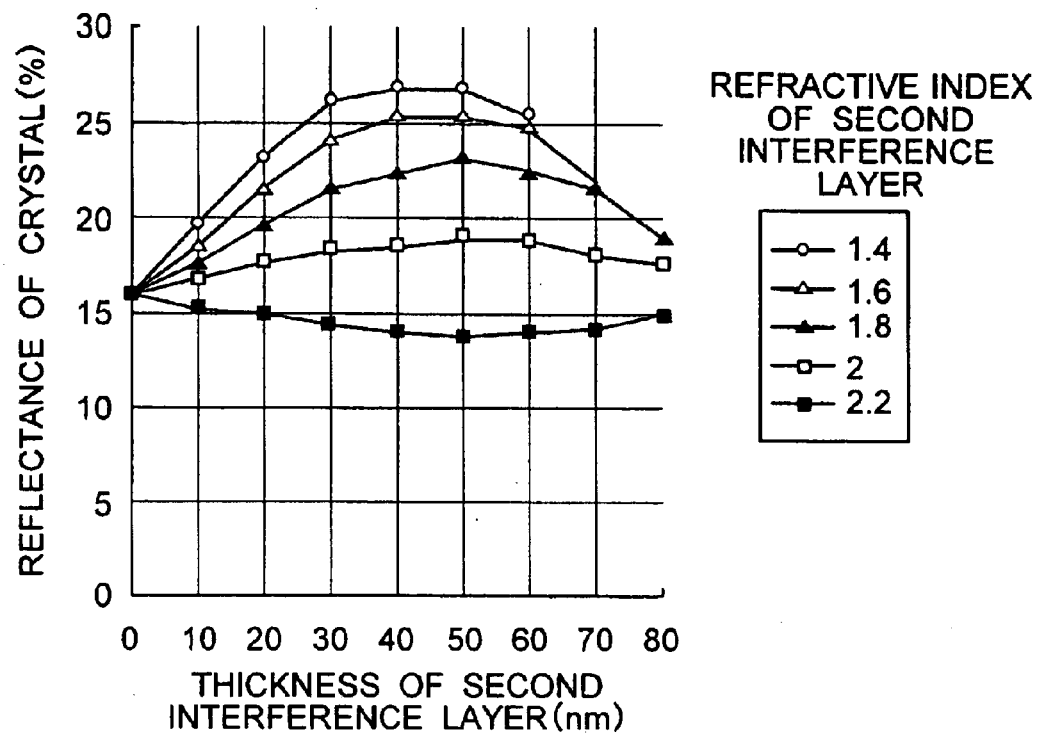
FIG. 3 is a graph showing a calculation example of the present invention.

FIG. 3 shows the calculation result when the film thickness of the first interference layer is optimized so that a ratio (Rc−Ra)/Rc of reflectance Rc of the crystal to reflectance Ra of amorphous is at least 90% by using the film thickness of the second interference layer and the refractive index as the variables. When the refractive index of the second interference layer is greater than the refractive index of the first interference layer (n=2.2), reflectance of the crystal is lowered at the film thickness of the second interference layer of greater than 0 (that is, when the second interference layer exists), but when the refractive index of the second interference layer is smaller than 2.0 below the refractive index of the first interference layer, the effect of improving the reflectance can be obtained. Target reflectance is at least 15% as stipulated in the 4.7 GBDVD-RAM standard. Since this calculation does not consider the effect that the laser beam is reflected on the substrate surface, the calculation result gives a value that is substantially greater by about 4%.

Therefore, the target value of reflectance of this calculation is at least 19%. The refractive index of the second interference layer that satisfies this condition is 1.4 to 1.8. Even when the refractive index of the second interference layer is within 1.4 to 1.8, the condition described above can be satisfied if the film thickness of the second interference layer is from 20 nm to 78 nm. Therefore, the refractive index of the second interference layer is smaller than at least the refractive index of the first interference layer and is preferably not greater than 1.8. The film thickness is preferably from 20 nm to 78 nm. The ranges of the film thickness and refractive index are when the target value of the reflectance is 19%. Practically, when in-plane uniformity of the optical disk and the yield of mass-production are taken into account, reflectance must be further elevated by about 3%. In this case, the target can be satisfied when the refractive index of the second interference layer is 1.4 to 1.6 and its film thickness is 20 nm to 70 nm.

Figure 4:
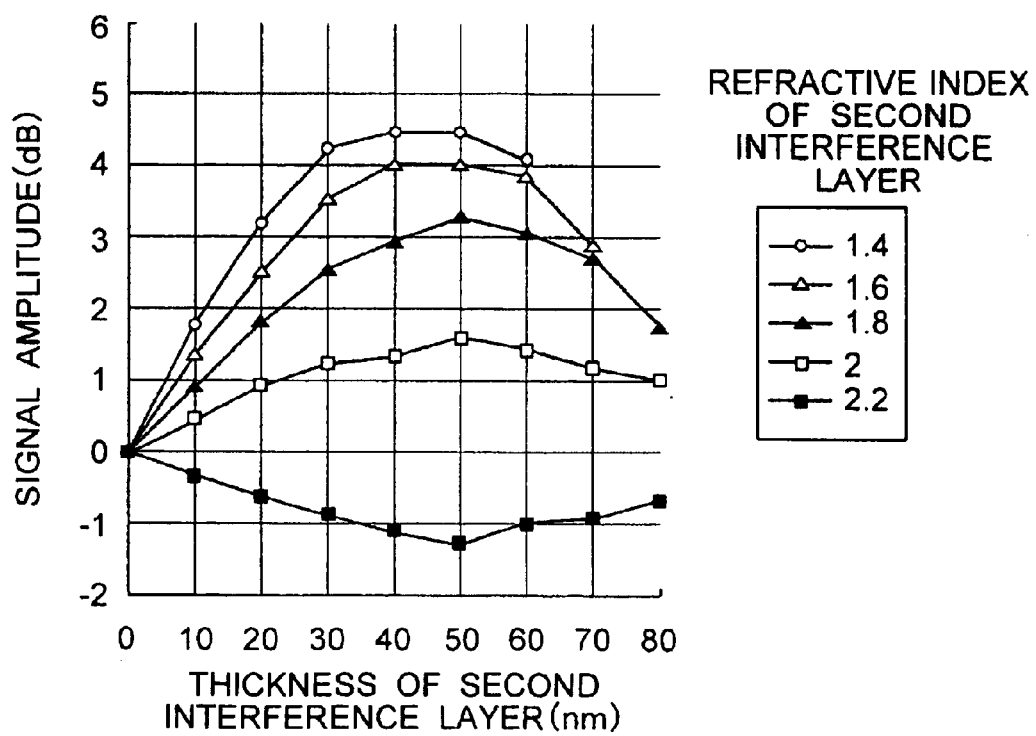
FIG. 4 is a graph showing another calculation example of the present invention.

FIG. 4 shows the calculation result of dependence of the reproduction signal on the film thickness and refractive index of the second interference layer when the film thickness of the first interference layer is optimized so that reflectance Rc of the crystal is at least 20%. When the refractive index of the second interference layer is greater than that of the first interference layer (n=2.2), the signal amplitude of the reproduction signal drops at a film thickness of the second interference layer of greater than 0.0 (that is, when the second interference layer exists). When the refractive index of the second interference layer is smaller than 2.0 and smaller than the refractive index of the first interference layer, the effect of improving the signal amplitude of the reproduction signal can be obtained. Particularly when the film thickness of the second interference layer is greater than 20 nm, the effect of improving the signal amplitude of the reproduction signal of at least 1 dB can be obtained even at the refractive index of 2.0. The optimal thickness of the second interference layer is about 45±25 nm. It is therefore preferred that the refractive index of the second interference layer is smaller than at least the refractive index of the first interference layer and its film thickness is at least 20 nm. Particularly when the refractive index of the second interference layer is not greater than 1.8 and the film thickness is 20 nm to 78 nm, the signal amplitude of the reproduction signal can be improved by at least 2 dB.

Figure 5:
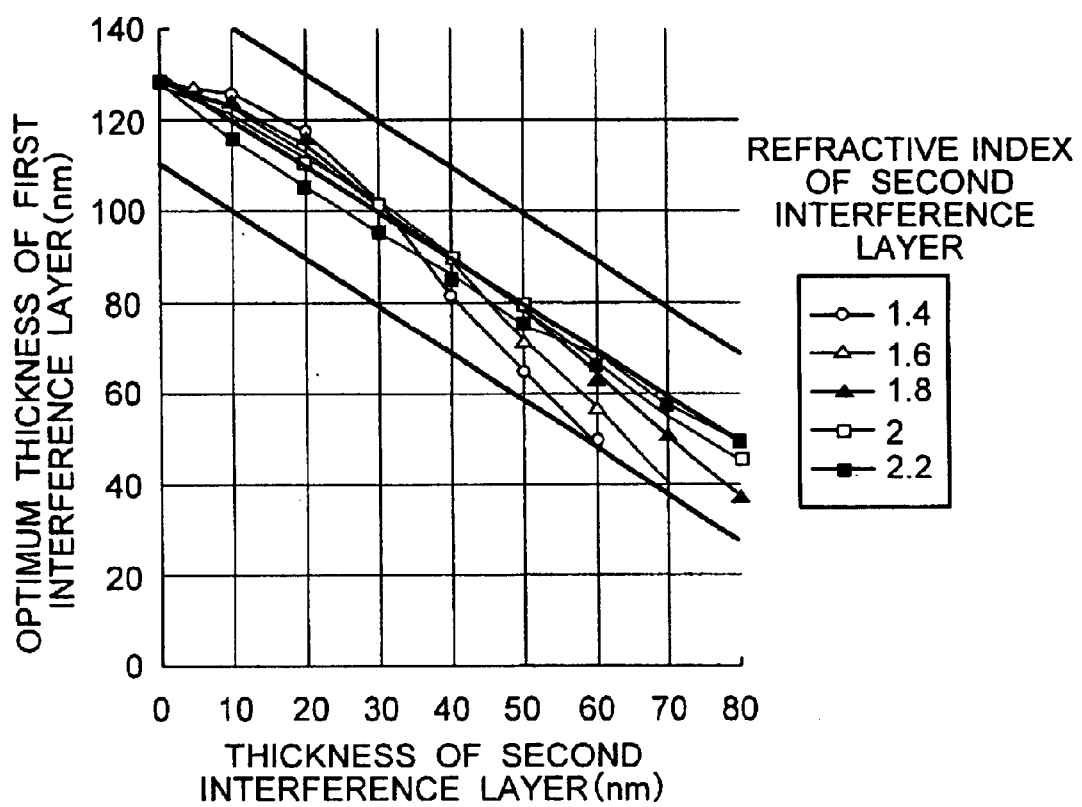
FIG. 5 is a graph showing another calculation example of the present invention.

FIG. 5 shows the relation of the optimal film thickness of the first interference layer versus the film thickness of the second interference layer and its refractive index when the calculation shown in FIG. 3 is conducted. The sum of the film thickness of the first interference layer and that of the second interference layer is optimally 130±20 nm. The optimal value concentrates particularly on 130±10 nm. It is thus important to keep this relation.

The calculation described above is conducted when the wavelength of the reproducing laser is 660 nm. When the reproducing laser having other wavelength is used, the film thickness of the second interference layer is preferably $\lambda/40$ to $\lambda/10$, more preferably $\lambda/30$ to $\lambda/10$ with $\lambda$ representing the laser wavelength. The sum of film thickness of the first and second interference layers is preferably $\lambda/5\pm\lambda/30$, more preferably $\lambda/5\pm\lambda/60$.

Figure 6:
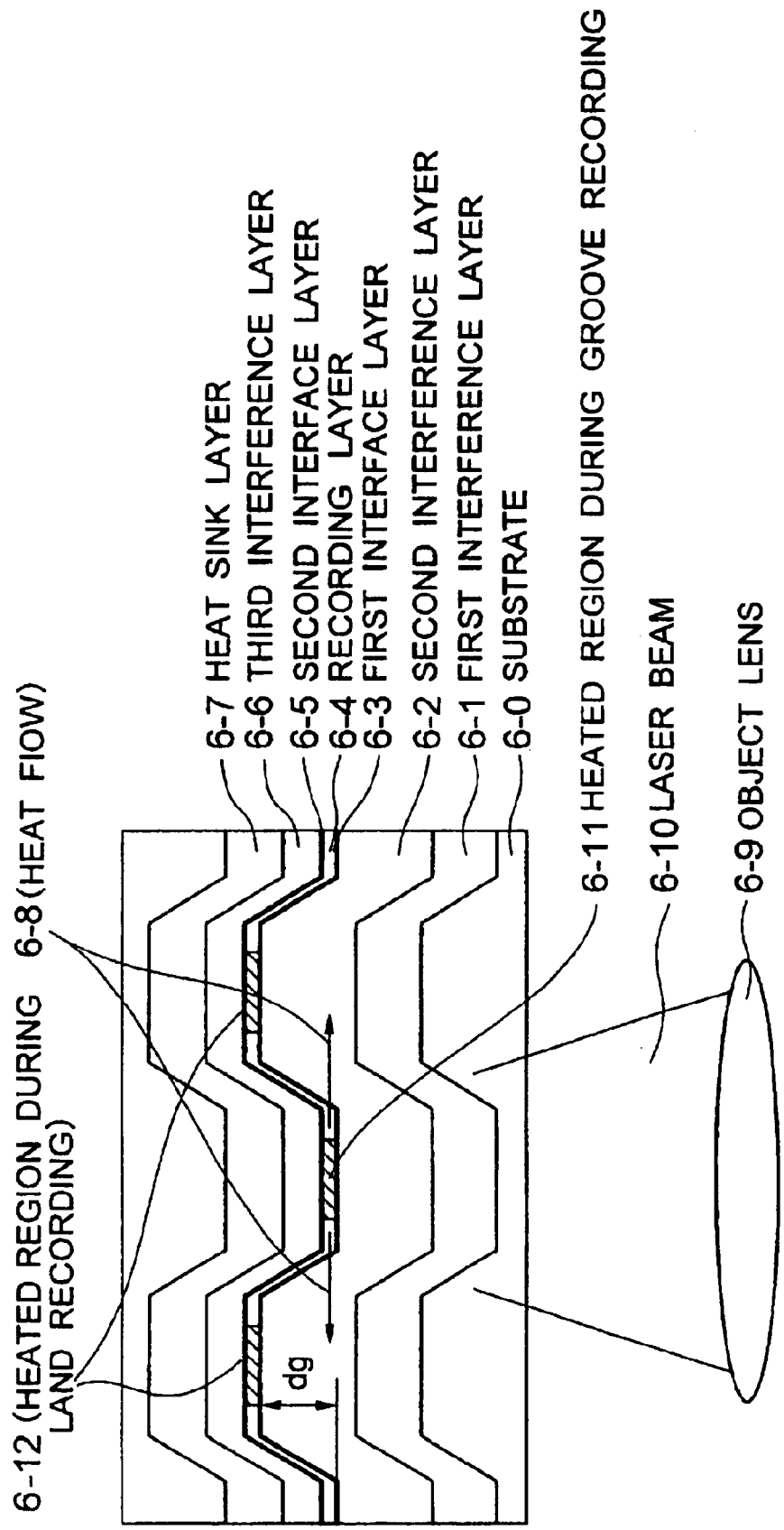
FIG. 6 is a conceptual view useful for explaining the principle of the present invention.
Figure 7:
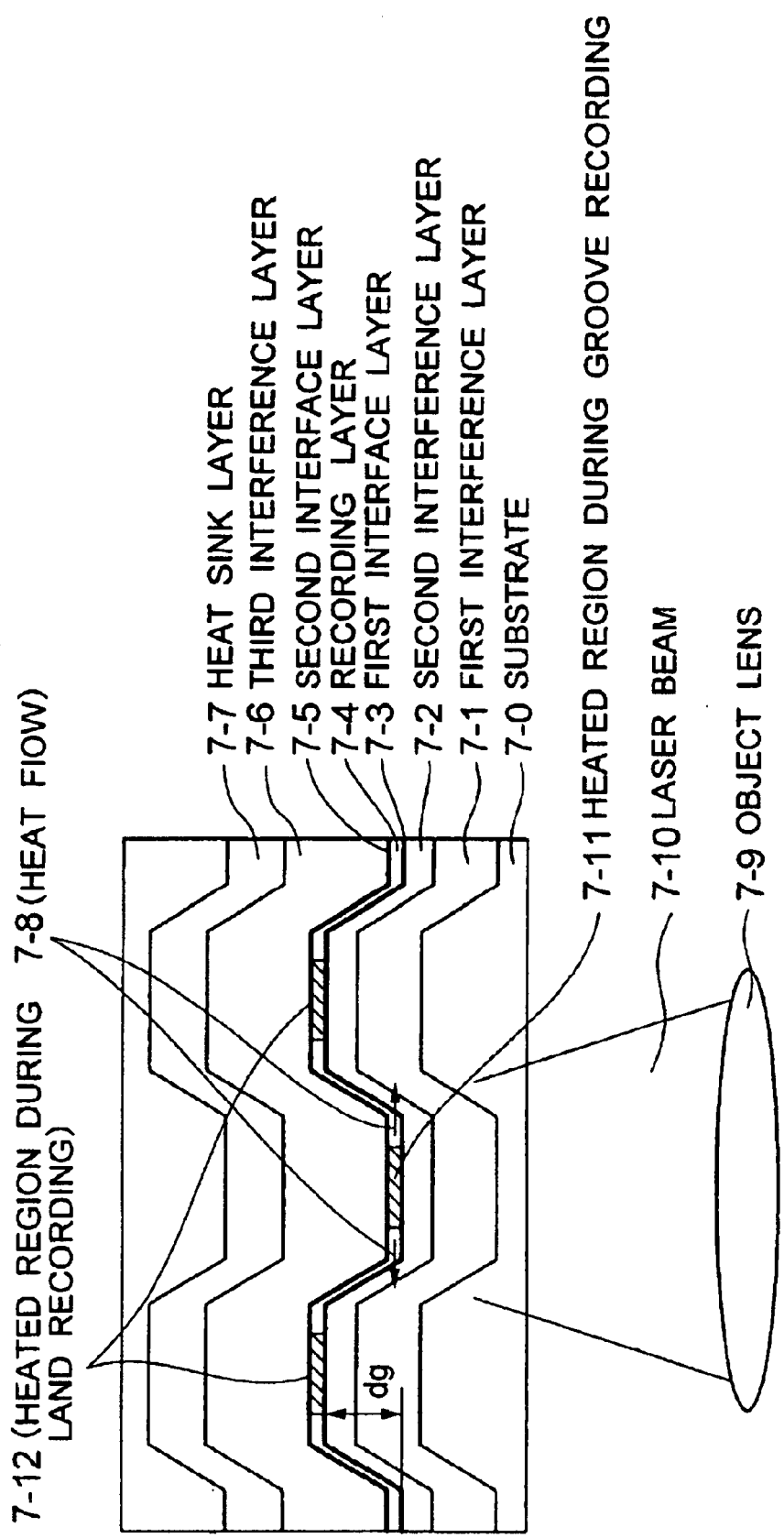
FIG. 7 is a conceptual view useful for explaining the principle of the present invention.

Next, the reason will be explained why cross-erase can be suppressed when thermal conductivity of the first interference layer is lower than that of the second interference layer and the distance between the first interference layer and the recording layer is not greater than the groove depth dg. To suppress cross-erase, it is very important to minimize the heat flow towards the adjacent tracks. FIG. 6 shows the heat flow during groove recording when thermal conductivity of the second interference layer is greater than that of the first interference layer and the distance between the first interference layer and the recording layer is greater than the groove depth dg. In this case, the second interference layer 6-2 having high thermal conductivity mainly exists in the direction of the adjacent track of a heated region 6-1 during groove recording. Therefore, heat is likely to diffuse in the direction of the adjacent tracks and eventually invites cross-erase. In contrast, when thermal conductivity of the first interference layer 7-1 is lower than that of the second interference layer 7-2 and the distance between the first interference layer 7-1 and the recording layer 7-4 is smaller than the groove depth dg as shown in FIG. 7, the first interference layer 7-1 having low thermal conductivity main exists in the direction of the adjacent tracks of the heated region 7-11 during groove recording. Therefore, the heat flow 7-8 becomes small and cross-erase can be suppressed. In this way, the heat flow 7-8 in the direction of the adjacent tracks of the heated region 7-11 during groove recording depends extremely greatly on the distance between the first interference layer 7-1 and the recording layer 7-4.

The explanation given above deals with the heat flow that flows from the groove to the land during groove recording. To control the heat flow from the land to the groove, the film thickness of the third interference layer is of importance. This phenomenon will be explained with reference to FIGS. 6 and 7. When thermal conductivity of the heat sink layer 6-7 is higher than that of the third interference layer 6-6 and the distance between the heat sink layer 6-7 and the recording layer 6-4 is smaller than the groove depth dg (FIG. 6), the heat sink layer 6-7 mainly exists in the direction of the adjacent tracks of the heated region 6-12 during land recording. Therefore, heat is more likely to flow in the direction of the adjacent tracks. In contrast, when thermal conductivity of the heat sink layer 7-7 is higher than that of the third interference layer 7-6 and the distance between the heat sink layer 7-7 and the recording layer 7-4 is greater than the groove depth dg as shown in FIG. 7, the third interference layer 7-6 having low thermal conductivity exists in the direction of the adjacent tracks of the heated region 7-12 during land recording. Therefore, heat cannot easily flow in the direction of the adjacent tracks and eventually, cross-erase can be suppressed.

FIG. 15 tabulates altogether thermal conductivity of each of the first and second interference layers, the difference of their refractive indices, the sum of the film thickness of the second interference layer and the first interface layer (corresponding to the distance between the first interference layer and the recording layer), reflectance, cross-erase and exfoliation defect when the first interface layer is, or is not, combined, on the basis of the optical and thermal observation given above.

The structures that provide satisfactory results to all of reflectance, cross-erase and exfoliation defect are only the structure A and the structure K. The differences between the structure A and the structure K reside in the difference of thermal conductivity k1 of the first interference layer and the thermal conductivity k2 of the second interference layer, and the difference of the sum of the film thickness of the second interference layer and the first interface layer relative to the groove depth dg (corresponding to the distance between the first interference layer and the recording layer). When these structures A and K are compared with each other, the structure K is more realistic for the following reason. The materials having a low refractive index used for the second interference layer in the present invention are those having relatively high thermal conductivity such as $SiO_2$, $Al_2O_3$, MgO, and so forth, in view of heat-resistance and productivity. Therefore, it is practically difficult to reduce thermal conductivity of the second interference layer to a level lower than thermal conductivity of the first interference layer as in the structure A.

The optical calculation result given above reveals that the effect can be obtained even when the film thickness of the second interference layer is increased to about $\lambda/4$. The groove depth is generally about $\lambda/6$ in the case of land-groove recording. Therefore, the upper limit of the film thickness of the second interference layer is limited by the groove depth dg.

Hereinafter, an embodiment of the present invention is given.

Thin films of the first interference layer: $(ZnS)_{80}(SiO_2)_{20}$ (100 nm), the second interference layer: $Al_2O_3$ (35 nm), the first interface layer: $Cr_2O_3$ (2 nm), the recording layer 3: $Ge_{28}Sb_{18}Te_{54}$ (7 nm), the second interface layer: $Cr_2O_3$ (5 nm), the third interference layer: $(ZnS)_{80}(SiO_2)_{20}$ (40 nm), the thermal buffer layer: $Cr_{75}(Cr_2O_3)_{25}$ (60 nm) and the heat sink layer: $Al_{98}Ti_2$ (100 nm) are serially formed by a sputtering process over a 0.6 mm-thick substrate for land-groove recording which is made of a polycarbonate, has a track pitch of 0.615 $\mu$m and a groove depth of 65 nm, and in which address information for recording information to both of the land and the groove is disposed at the leading part of each sector.

Another information recording member having the same structure is bonded to the information recording member described above by using an adhesive. The information recording medium having the construction described above is referred to as an "optical disk A". Incidentally, the polycarbonate substrate described above has a refractive index of 1.58. Thirty-five zones exist in the radial direction of this optical disk, and 25 to 59 sectors exist round one turn inside the zone. The track pitch is 0.615 $\mu$m.

Figure 8:
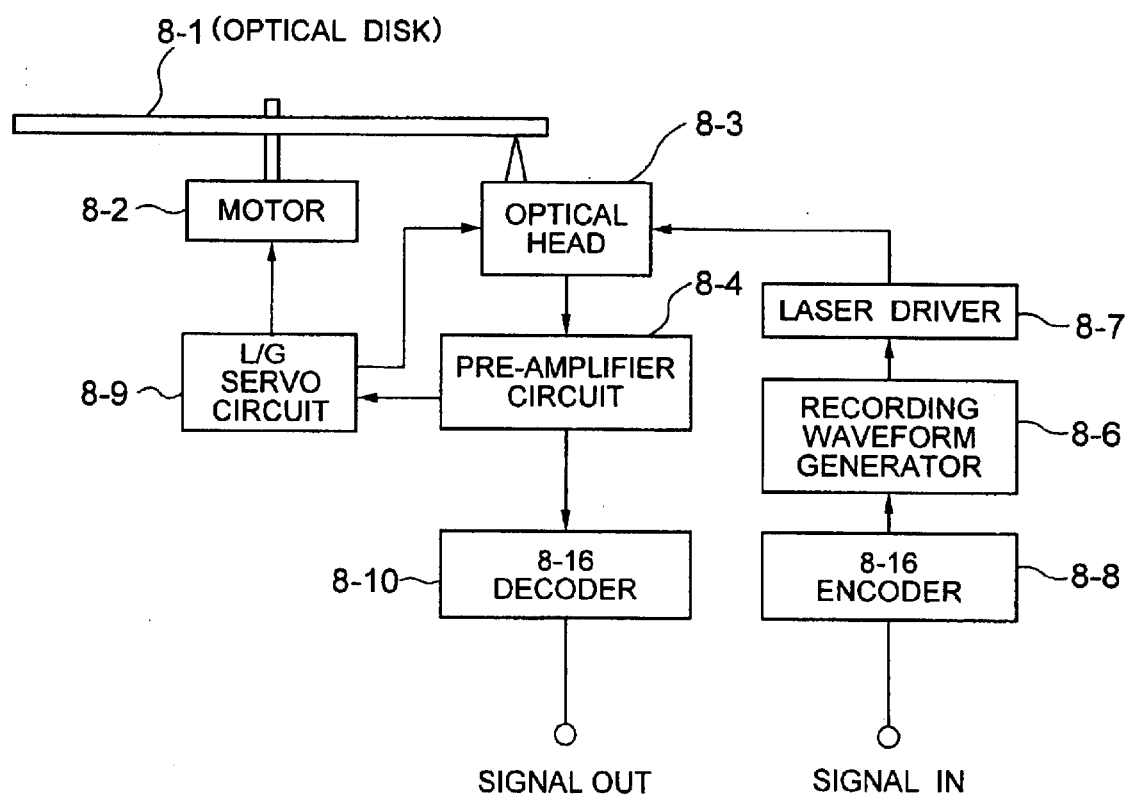
FIG. 8 is a block diagram of an information recording apparatus used in an embodiment of the present invention.

The information is recorded to the optical disk A by using the information recording/reproducing apparatus shown in FIG. 8. The operation of the information recording/reproducing apparatus will be explained. A ZCLV (Zone Constant Linear Velocity) system for changing the number of revolution of the disk for each recording/reproducing zone is employed as a method of controlling a motor when recording or reproduction is executed. The disk linear velocity is about 8.2 m/s.

The information from outside the recording apparatus is transferred to an 8-16 encoder with 8 bits forming a unit. To record the information onto the optical disk 8-1, a modulation system for converting 8 information bits to 16 bits, or a so-called "8-16 encoding system", is used for recording. In this encoding system, information having mark length of 3T to 14T corresponding to the 8-bit information is recorded.

The digital signals of 3T to 14T converted by the 8-16 encoder 8-8 are transferred to a recording waveform generator 8-6. Laser irradiation of a low power level of a width of about T/2 is conducted during laser irradiation of a high power level at a high power pulse width of about T/2 and laser irradiation of an intermediate power level is conducted during a series of high power pulses, generating a multi-pulse recording waveforms. In this instance, the high power level for forming the recording mark is set to 10.0 mW and the intermediate power level capable of erasing the recording mark is set to 4.0 mW. In the recording waveform generator 8-6, the signals of 3T to 14T are caused to alternately correspond to "0" and "1" in a time sequence.

When the signal is "0", laser power of the intermediate power level is irradiated and when the signal is "1", a series of high power pulse train inclusive of the high power level pulses is irradiated. In this instance, the portion of the optical disk 1 to which the laser beam of the intermediate power level is irradiated is turned to the crystal (space portion), and the portion to which a series of high power pulse train inclusive of the high power level pulses is irradiated changes to the amorphous state (mark portion). The recording waveform generator 8-6 includes a multi-pulse waveform table corresponding to a system (adaptive recording waveform control) for changing the leading pulse width and the last trailing pulse width of the multi-pulse waveforms in accordance with the length of the preceding and subsequent space portions of the mark portion when generating a series of high power pulse train inclusive of the high power level for forming the mark portion. Consequently, the recording waveform generator 8-6 generates the multi-pulse recording waveform that can minimize and preclude the influences of the thermal interference between the marks occurring between the marks.

The recording waveform generated by the recording waveform generator 8-6 is transferred to a laser driver 8-7. The laser driver 8-7 lets a semiconductor laser inside an optical head 8-3 emit light on the basis of this recording waveform.

The optical head 8-3 mounted to this recording apparatus uses a semiconductor laser of an optical wavelength of 655 nm as the laser beam for recording the information. An object lens of a lens NA 0.6 contracts this laser beam onto the recording layer of the optical disk 8-1, and the laser beam of the laser corresponding to the recording waveform is irradiated to record the information.

Generally, when a laser beam having a laser wavelength $\lambda$ is condensed by a lens having a numerical aperture NA, a spot diameter of the laser beam is approximately $0.9 \times \lambda/NA$. Under the condition described above, therefore, the spot diameter of the laser beam is about 0.98 microns. Polarized light of the laser beam at this time is circularly polarized light.

This recording apparatus is adapted to a system (a so-called "land-groove recording system) for recording the information to both groove and land (regions between the grooves). The recording apparatus can arbitrarily select tracking to the land and the groove through its L/G servo circuit 8-9.

Reproduction of the recorded information, too, is conducted by using the optical head 8-3 described above. The laser beam is irradiated onto the recorded mark and reflected light from the mark and from portions other than the mark is detected to acquire a reproduction signal. A pre-amplitude circuit 8-4 increases the amplitude of this reproduction signal and transfers the signal to an 8-16 decoder 8-10. The 8-16 decoder 8-10 converts the information in a 16-bit unit to 8-bit information. The operation described above finishes reproduction of the recorded mark.

When recording is conducted to the optical disk 8-1 under the condition described above, the mark length of the 3T mark as the shortest mark is about 0.42 $\mu$m and the mark length of the 14T mark as the longest mark is about 1.96 $\mu$m.

When reflectance of the crystal and the degree of modulation at the land/groove (the value obtained by normalizing the difference of reflectance of the crystal from that of the amorphous state by reflectance of the crystal) are measured by using this apparatus, the measurement result is 22%, 55% (land) and 56% (groove). It is thus found that satisfactory reproduction signals can be obtained. The values after 10,000 times over-write are 20.2%, 54% (land) and 54% (groove), and they can be sufficiently used for practical application. When a shelf life acceleration test is carried out under the condition of 90° C. and 80% humidity, no exfoliation defect occurs even after 200 hours.

FIG. 16 illustrates altogether the refractive indices of the first and second interference layers, their thermal conductivity and reflectance, the existence and absence of cross-erase and the existence and absence of exfoliation defect when the first interference layer, the second interference layer, the first interface layer and the composition and thickness of the second layer of the disk A are changed.

The disk B represents the case where thermal conductivity of the second interference layer is greater than that of the first interference layer and the sum of the film thickness of the second interference layer and the first interface layer is greater than the groove depth (65 nm). The disk C represents the case where the first interface layer does not exist. The disk D represents the case where thermal conductivity of the first interference layer is greater than that of the second interference layer, and the sum of the film thickness of the second and first interference layers is smaller than the groove depth (65 nm). The disk E represents the case where the refractive index of the second interference layer is greater than that of the first interference layer. All these disks are not practical because any of the drop of reflectance, cross-erase and exfoliation occurs.

Disks having the same structure as that of the disk A with the exception of the groove depth of the substrate are provisionally fabricated, and the existence/absence of cross-erase is measured with the result listed below.

| groove depth (nm) | existence of cross-erase |
| --- | --- |
| 25 | yes |
| 30 | yes |
| 37 | no |
| 65 | no |
| 76 | no |

It can be understood from the result given above, too, that when the sum of the film thickness of the second interference layer and the first interface layer (corresponding to the distance between the first interference layer and the recording film: 37 nm) is smaller than the groove depth, cross-erase develops but when the sum of the film thickness of the second interference layer and the first interface layer is greater than the groove depth, cross-erase does not develop.

As is obvious from the result given above, any of the drop of reflectance, cross-erase and exfoliation defect occurs in the optical disks having the structures that fail to satisfy any one of the following conditions (1) to (3):

(1) Thermal conductivity of the first interference layer is smaller than that of the second interference layer and the distance between the first interference layer and the recording layer is smaller than the groove depth.
(2) The refractive index of the second interference layer is greater than that of the first interference layer.
(3) The first interface layer is sandwiched between the second interference layer and the recording layer.

Whether or not exfoliation defect occurs is examined when various materials are used for the first interface layer in place of $Cr_2O_3$ of the disk A. The result is listed below.

| first interface layer | existence of exfoliation defect |
|---|---|
| Ge$_3$N$_4$ | no |
| Si$_3$N$_4$ | no |
| SiO$_2$ | yes |
| Al$_2$O$_3$ | yes |
| MgO | yes |
| TiO$_2$ | no |
| V$_2$O$_3$ | no |
| Mn$_3$O$_4$ | no |
| Fe$_2$O$_3$ | no |
| Mo$_2$O$_3$ | no |
| W$_2$O$_3$ | no |
| Co$_2$O$_3$ | no |
| AlN | yes |

It has thus been found that when nitrides of Si and Ge and oxides of transition metals such as Ti, V, Mn, Fe, Mo, W, Co, etc, are used for the first interface layer, exfoliation defect does not occur.

Next, the optimal composition of each layer and its optical film thickness will be explained.

Generally, the material existing on the light incidence side of the first interference layer is a plastic substrate such as a polycarbonate or an organic material such as a UV-setting resin. The refractive indices of these materials are from about 1.4 to about 1.6. In order to effectively induce reflection between the organic material and the first interference layer, the refractive index of the first interference layer is preferably at least 2.0.

The first interference layer has an optical refractive index greater than that of the material (corresponding to the substrate in this embodiment) that exists on the light incidence side. The refractive index is preferably as great as possible within the range in which absorption of light does not occur. More concretely, the material has the refractive index n between 2.0 and 3.0 and does not absorb light. The material contains particularly preferably oxides, carbides, nitrides, sulfides and selenides of metals. Thermal conductivity is preferably not greater than 2 W/mk at most. ZnS—SiO$_2$ type compounds are particularly suitable for the first interference layer because their thermal conductivity is low.

Figure 9:
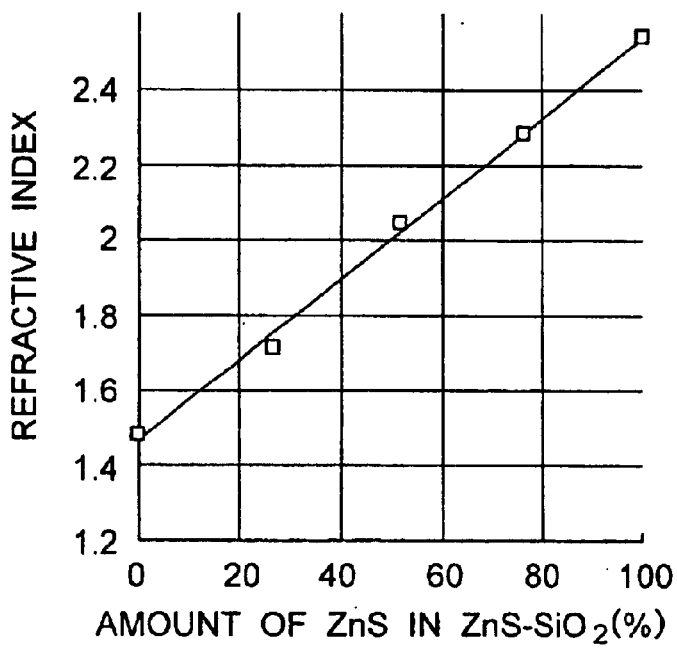
FIG. 9 is a graph showing the relation between a composition of a first interference layer used in the present invention and a refractive index.

FIG. 9 shows the relation between a ZnS composition ratio and the refractive index when the composition ratio of ZnS and SiO$_2$ is changed. The relation between the ZnS composition ratio and thermal conductivity is listed below.

| ZnS composition ratio | thermal conductivity |
|---|---|
| 1 | 2 W/mk |
| 50 | 0.6 W/mk |
| 70 | 0.5 W/mk |
| 80 | 0.5 W/mk |
| 95 | 1 W/mk |
| 100 | 4 W/mk |

Heat conductivity of Al$_2$O$_{31}$ SiO$_2$ and MgO used for the second interference layer is 1 W/mk, 2 W/mk and 4 W/mk, respectively, as also shown in FIG. 16. Therefore, when these materials are used for the second interference layer, thermal conductivity of the first interference layer becomes lower than that of the second interference layer if the ZnS composition ratio is 50 to 95%, and the refractive index becomes sufficiently great such as 2.0 or more. In consequence, the effect of the present invention can be obtained.

The sum of the film thickness of the first and second interference layers is preferably 130±20 nm as already described. The optimal film thickness of the second interference layer is 20 to 70 nm. Therefore, the suitable film thickness of the first interference layer is 40 to 130 nm.

The refractive index of the second interference layer is not greater than at least the refractive index of the first interference layer, and is not greater than 2.0, preferably not greater than 1.8.

Materials having a low refractive index such as Al$_2$O$_3$, SiO$_2$, MgO, etc, are particularly suitable for the second interference layer. Alternatively, their mixed materials can be used. The refractive indices of Al$_2$O$_3$, SiO$_2$ and MgO measured by the present inventors are 1.65, 1.46 and 1.73. The refractive indices of the mixed materials change depending on the mixing ratio, and are not greater than 1.8 in all cases. Generally, when an oxide of any of the elements of Al, Si and Mg is contained, the refractive index drops in proportion to the content of these oxides. Therefore, the sum of the amounts of the Al, Si and Mg contained in the second interference layer must be greater than the sum of these oxides contained in the first interference layer.

The properties required for the second interference layer are that its refractive index is smaller than that of the first interference layer, and it is stable both thermally and chemically. Such materials contain the oxide of any of Al, Si and Mg. Particularly when the sum of the amounts of O, N, C and S in the second interference layer is X, it is important that the amount of O is at least 50% X and the sum of the amounts of Al, Si and Mg is at least 70% (1−X). For, when the amount of O is smaller than 50% X, or when the amount of Al, Si and Mg is smaller than (1−X)×50%, the refractive index is likely to increase, and the effect of the present invention cannot be obtained readily.

Figure 10:
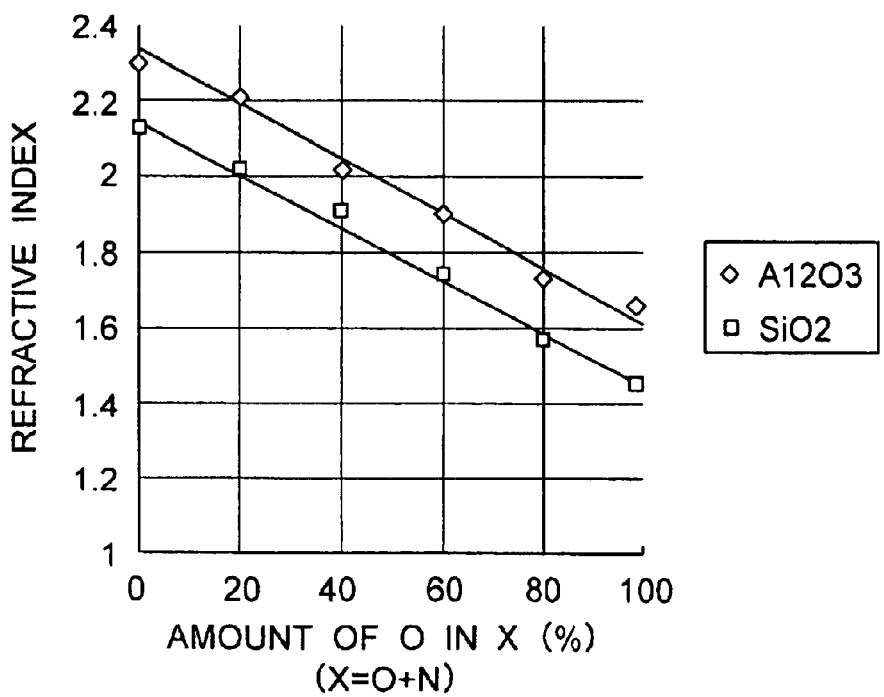
FIG. 10 is a graph showing the relation between a composition of a second interference layer used in the present invention and a refractive index.
Figure 11:
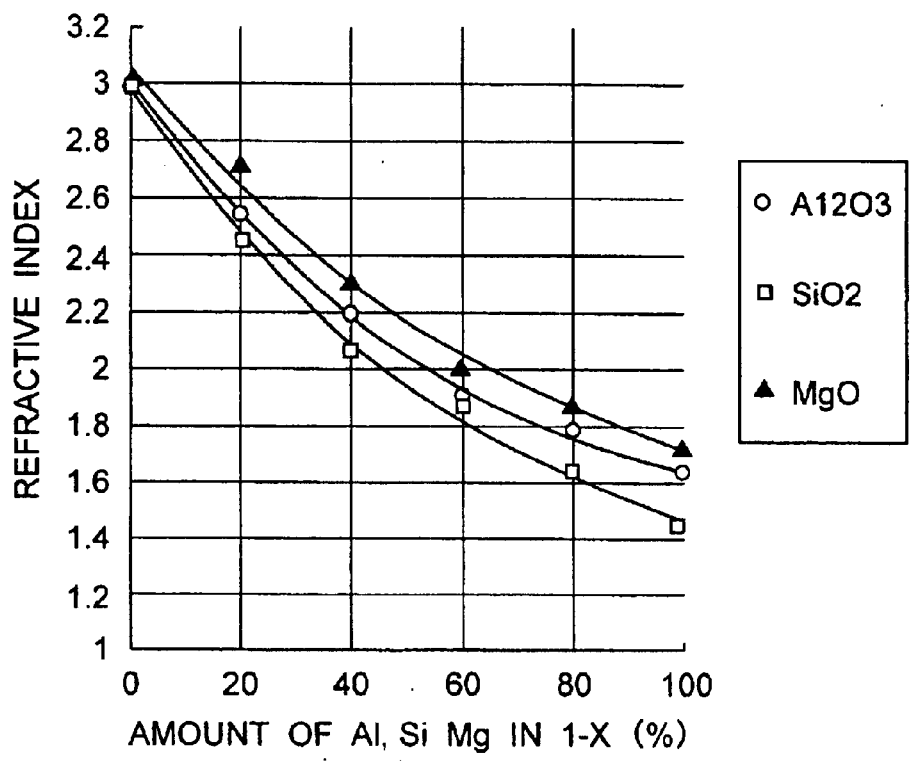
FIG. 11 is a graph showing the relation between a composition of a second interference layer used in the present invention and a refractive index.

FIGS. 10 and 11 show the relation between the second interference layer and the refractive index as examples.

FIG. 10 shows the relation between the amount of O in the sum X of O and N and the refractive index when the mixing ratio of SiO$_2$ and Si$_3$N$_4$ is changed and when the mixing ratio of Al$_2$O$_3$ and AlN is changed, respectively. When SiO$_2$ and Si$_3$N$_4$ are mixed, the refractive index changes in proportion to the mixing ratio. The amount of O in X, at which the refractive index is not greater than 1.8, is at least 49%. The amount of O in X, at which the refractive index is not greater than 2.0, is at least 20%. Therefore, when the amount of O in X is at least 50%, the effect of the present invention can be obtained sufficiently. When Al$_2$O$_3$ and AlN are mixed, too, the refractive index changes in proportion to the mixing ratio. The amount of O in X, at which the refractive index is not greater than 1.8, is at least 74%. The amount of O in X, at which the refractive index is not greater than 2.0, is at least 46%. Therefore, when the amount of O in X is at least 50%, the effect of the present invention can be obtained sufficiently in both the Al$_2$O$_3$—AlN system and the Si$_2$—Si$_3$N$_4$ system.

FIG. 11 shows the relation between the amounts of Al, Si and Mg in 1−X and the refractive index when Cr$_2$O$_3$ is added to Al$_2$O$_3$, SiO$_2$ and MgO. The refractive index is below 1.8 when the amount of Al is at least 73% of the sum of the amounts of Cr and Al in the Al$_2$O$_3$—Cr$_2$O$_3$ system, when the amount of Si is at least 62% of the sum of the amounts of Cr and Si in the SiO$_2$—Cr$_2$O$_3$ system and when the amount of Mg is at least 88% of the sum of the amounts of Cr and Mg in the MgO—Cr$_2$O$_3$ system, respectively. The refractive index is below 0.2 when the amount of Al is at least 54% of the sum of the amounts of Cr and Al in the Al$_2$O$_3$—Cr$_2$O$_3$ system, when the amount of Si is at least 46% of the sum of the amounts of Cr and Si in the $SiO_2$—$Cr_2O_3$ system and when the amount of Mg is at least 65% of the sum of the amount of Cr and Mg in the MgO—$Cr_2O_3$ system. Therefore, when the amounts of Al, Si and Mg in 1-X are 70% or more, the effect of the present invention can be obtained sufficiently. The oxides of Al, Si and Mg all have a low refractive index as already described and their mixtures have a low refractive index. Therefore, when other metal oxide is added to these mixtures, the effect of the present invention can be obtained when the sum of the amounts of Al, Si and MG in 1-X is greater than 70%. Though this embodiment represents the result when $Cr_2O_3$ is added as the addition metal, the effect of the present invention can be obtained by adding other metal oxides, metal nitrides, semiconductor oxides, semiconductor nitrides, etc, and by adjusting the amounts so as to satisfy the condition described above because they have refractive indices equivalent to that of $Cr_2O_3$.

Generally, the second interference layer is preferably made of a stoichiometric amount of a single substance of a compound, or its mixture, that does not easily absorb light. When such a compound is laminated adjacent to the recording layer, however, exfoliation defect is likely to occur between the recording layer and the second interference layer. In such a case, an oxide or nitride of the following transition metal elements, that are likely to turn to non-stoichiometric compounds, or their mixtures, may be added to the second interference layer. If the exfoliation suppression effect is not sufficient even when the measures described above are taken, the first interface layer may be sandwiched between the second interference layer and the recording layer to improve adhesion. Generally, peel is likely to occur between the recording layer and the second interference layer in accordance with the amounts of the oxides of Al, Si and Mg. Therefore, the sum of the oxides of Al, Si and Mg contained in the first interface layer must be smaller than the sum of the oxides of Al, Si and Mg contained in the second interference layer. The oxides and nitrides of the transition metal elements or their mixtures, that are likely to turn to the non-stoichiometric compounds, are particularly excellent as the materials of the first interface layer. Furthermore, the oxides and nitrides of Si, Ge, etc, are excellent because they are likely to turn to the non-stoichiometric compounds.

More concretely, the oxides and nitrides of Ti, V, Cr, Mn, Fe, Co, Ni, Cu, Y, Zr, Nb, Mo, Tc, Hf, Ta, W, La and Ce, or their mixtures, are suitable. Particularly, it is possible to use oxides of Cr—O type materials and Co—O type materials such as $Co_2O_3$ and CoO, nitrides of Ta—N type materials, Al—N type materials, Si—N type materials, Al—Si—N type materials (e.g. $AlSiN_2$) and Ge—N type materials, carbides such as SiC, GeC, etc, or their mixtures.

The materials described above generally absorb light and cannot obtain optically excellent effects. However, the first interface layer exists more practically advantageously because it provides great effects in suppressing exfoliation, improving shelf life and suppressing degradation when over-write is conducted many times. The first interface layer is preferably thin within the range in which these effects are not lost. The examination result acquired by the present inventors represents that the film thickness of the first interface layer is sufficiently at least 0.5 nm. When the film thickness is greater than 5 nm, the problems such as the drops of reflectance and signal amplitude are more likely to occur. When the film thickness is greater than 20 nm, the drops of reflectance and signal amplitude are so great that the first interface layer is not practical. Therefore, the film thickness of the first interface layer is suitably from 0.5 to 20 nm, more preferably 0.5 to 5 nm.

A phase change recording material is particularly suitable for the recording layer used in the present invention. It has been found that a composition containing 23 to 33 atm % of Ge, 10 to 25 atm % of Sb and 50 to 60 atm % of Te, in particular, does not easily invite the drop of the number of times of the over-write operation as a material of the recording layer in place of $Ge_{28}Sb_{18}Te_{54}$ used in the embodiment described above. When 1 to 7% of $AgSbTe_2$ is added, fluidization of the recording film that occurs when over-write is conducted many times can be suppressed.

Similar effects can be obtained also when the composition described above is replaced by any of $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, GeTe, Ag—In—Sb—Te, Co—Ge—Sb—Te, V—Ge—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te, Bi—Ge—Sb—Te, W—Ge—Sb—Te and a composition approximate to these compositions. In this case, a part of Ge may be replaced by In.

When a recording layer containing up to 5 atm % of N in addition to each of the compositions described above is used, the reproduction signal output decreases but the merit can be obtained in that fluidization of the recording layer can be suppressed when over-write is conducted a large number of times.

The cross-erase reducing effect is great when the film thickness of the recording layer is not greater than the level difference (groove depth) between the land and the groove. The degree of modulation is great when the film thickness is 4 to 20 nm, and fluidization does not occur easily. The film thickness of 4 to 10 nm is more preferred. When the film thickness of the recording layer is smaller than 4 nm, reflectance and signal amplitude drop remarkably, but great effects can be obtained in suppressing over-write jitter and fluidization of the recording film when over-write is conducted a large number of times. When the film thickness of the recording layer is greater than 10 nm, reflectance and signal amplitude are satisfactory but the rise of over-write jitter and fluidization of the recording film at the time of over-write conducted many times appear remarkably.

Figure 12:
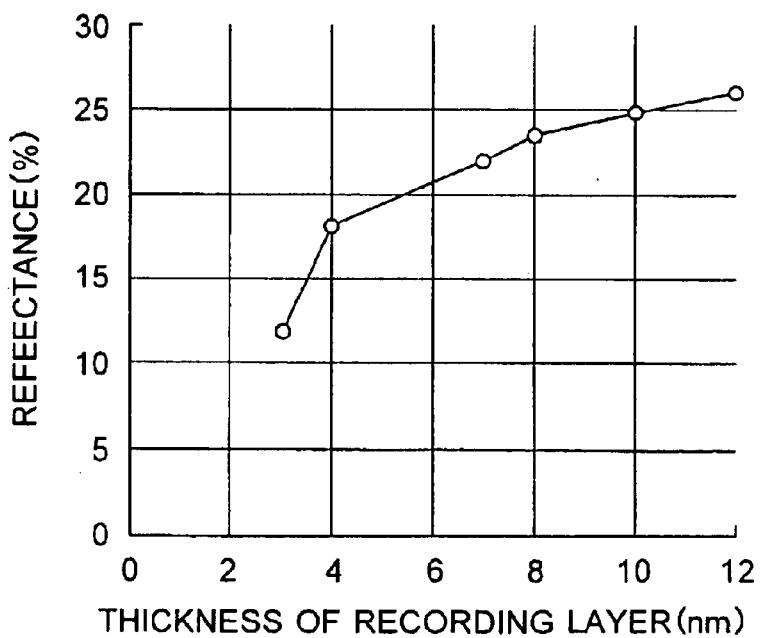
FIG. 12 is a graph showing the relation between a film thickness of a recording layer used in the present invention and reflectance.

FIG. 12 shows the relation between the film thickness of the recording layer and reflectance when the film thickness of the recording layer of the disk A is changed. In this case, the film thickness of each layer is optimized so that the degree of modulation becomes constant and reflectance becomes high as much as possible. When the film thickness of the recording layer is greater than 4 nm, reflectance is at least 18% and is satisfactory. When the film thickness is smaller than 4%, however, reflectance drastically drops below the target value of 15%. Therefore, this film thickness is not practical.

Figure 13:
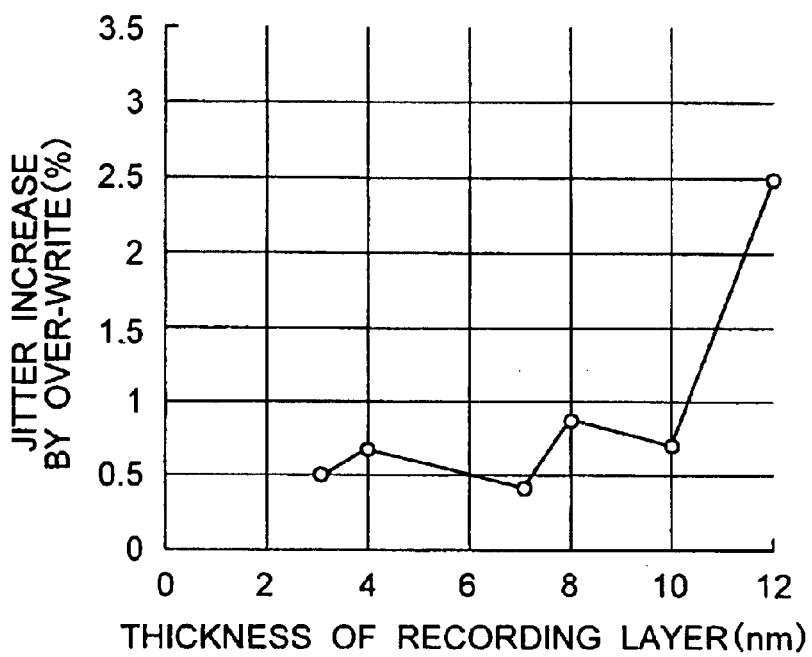
FIG. 13 is a graph showing the relation between a film thickness of a recording layer used in the present invention and a jitter increase by over-write.

FIG. 13 shows the relation between the film thickness of the recording layer and the jitter increase by over-write when the film thickness of the recording layer of the disk A is changed. When the film thickness of the recording layer is below 10 nm, the jitter increase by over-write is not greater than about 1% and remains within an allowable range. When the film thickness is greater than 10 nm, however, the jitter increase by over-write becomes so drastic that this film thickness is not practical.

In the present invention, recording is conducted by the change of atomic configuration in the recording layer. The term "change of atomic configuration" used herein means the change of the atomic configuration that hardly involves the external change of the film such as the phase change.

In this embodiment, recording is conducted to the phase-change recording layer containing Ge, Sb, Te, In, Ag, etc, as the principal components in the optical disk. The basic concept of the present invention is that the laser beam generates heat, and this heat controls optical characteristics (reflectance and degree of modulation) of the optical disk for recording the recording mark and its thermal characteristics (temperature distribution, cooling rate distribution). Therefore, the present invention is not particularly limited to the phase-change optical disk, and can similarly exhibit its effect in recording to magneto-optical recording layer containing Tb, Fe, Co, Dy, Gd, etc, as the principal components. The present invention is not particularly limited to the over-write type information recording medium, either. In the case of organic pigment recording that conducts recording by changing the shapes of the substrate and the recording layer, the change occurs only when a laser beam having high power is irradiated, and this change is irreversible. However, the present invention is not particularly limited to the over-write optical disk but can be adapted also to a write-once type optical disk because the basic concept of the present invention resides in that the laser beam generates heat and this heat is used to control the optical characteristics (reflectance, degree of modulation) and the thermal characteristics (temperature distribution, cooling rate distribution) of the optical disk for recording the recording mark, as described above.

The material of the second interface layer is referably oxides or nitrides of transition metal elements that are likely to turn to non-stoichiometric compounds, or the mixtures of these elements, in the same way as the first interface layer. Oxides and nitrides of semiconductors such as Si and Ge are also excellent because they are likely to turn to the non-stoichiometric compounds.

More concretely, oxides and nitrides, or mixtures, of Ti, V, Cr, Mn, Fe, Co, Ni, Cu, Y Zr, Nb, Mo, Tc, Hf, Ta, W, La, Ce, etc, are suitable. Particularly preferred are Cr—O type materials, oxides of Co—O type materials such as $Co_2O_3$ and CoO, Si—N type materials such as TaN, AlN and $Si_3N_4$, Al—Si—N type materials (such as $AlSiN_2$), nitrides of Ge—N type materials, carbides such as SiC and GeC, and their mixtures.

Since these materials generally absorb light, they do not provide optically good effects. However, the second interface layer provides the great effect of suppressing exfoliation, improving shelf life and suppressing over-write degradation when over-write is conducted a large number of times. The difference of the first interface layer from the second interface layer resides in the difference of the material existing on the opposite side to the adjacent surface to the recording layer. In the case of the first interface layer, the second interference layer exists on the surface opposite to the adjacent surface to the recording layer. In the second interface layer, the third interference layer exists on the surface opposite to the adjacent surface to the recording layer. The second interference layer contains the oxides of Al, Si and Mg as the principal components and is therefore extremely stable both thermally and chemically, as described above. In contrast, the third interference layer contains the sulfide such as ZnS and is therefore unstable both thermally and chemically. When the second interface layer is too thin in this case, the S atom in the third interference layer diffuses into the recording layer and induces the drop of reflectance and the drop of crystallization rate when over-write is conducted a large number of times. Therefore, the film thickness of the second interface layer is preferably thin within the range in which the effects described above are not lost. The examination result acquired by the present inventors reveals that the film thickness of the second interface layer is sufficiently at least 5 nm. When the film thickness exceeds 10 nm, the problems such as the drops of reflectance and signal amplitude are more likely to occur. When the film thickness exceeds 20 nm, the drop of both reflectance and signal amplitude becomes so great that the second interface layer cannot be used practically. Therefore, the film thickness of the second interface layer is from 5 to 20 nm, preferably from 5 to 10 nm.

From the optical aspect, the third interference layer is made of a material that does not absorb light. From the thermal aspect, its thermal conductivity is preferably as small as possible. More concretely, the refractive index n is from 1.5 to 3.0, and the material does not absorb light and preferably contains oxides, carbides, nitrides, sulfides or selenides of metals. The most suitable third interference layer is $(ZnS)_{80}(SiO_2)_{20}$ (molar ratio) or its compound in which the mixing ratio of ZnS and $SiO_2$ is changed (ZnS: 50 to 95 mol %) particularly because thermal conductivity drops remarkably.

The film thickness of the third interference layer is preferably from about 35 to about 200 nm. The thickness is preferably greater than the level difference between the land and the groove (groove depth on the substrate, about 1/7 to about 1/5 of the laser wavelength). The sum of the film thickness of the third interference layer and that of the thermal buffer layer may be greater than the level difference between the land and the groove. When the film thickness of the third interference layer is smaller than 35 nm, or when the sum of the film thickness of the third interference layer and that of the thermal buffer layer is smaller than the level difference between the land and the groove, heat generated at the time of recording to the recording layer transfers through the heat sink layer and the recording mark recorded to the adjacent track is likely to be erased. In other words, the problem of cross-erase develops. When the film thickness of the third interference layer is greater than 200 nm, the cooling rate in the recording layer at the time of recording becomes extremely small. In consequence, the crystal does not easily change to the amorphous state (the recording mark cannot be formed easily), and the reflectance distribution inside the disk plane becomes excessive great due to the film thickness distribution of the third interference layer inside the optical disk plane during production.

Figure 14:
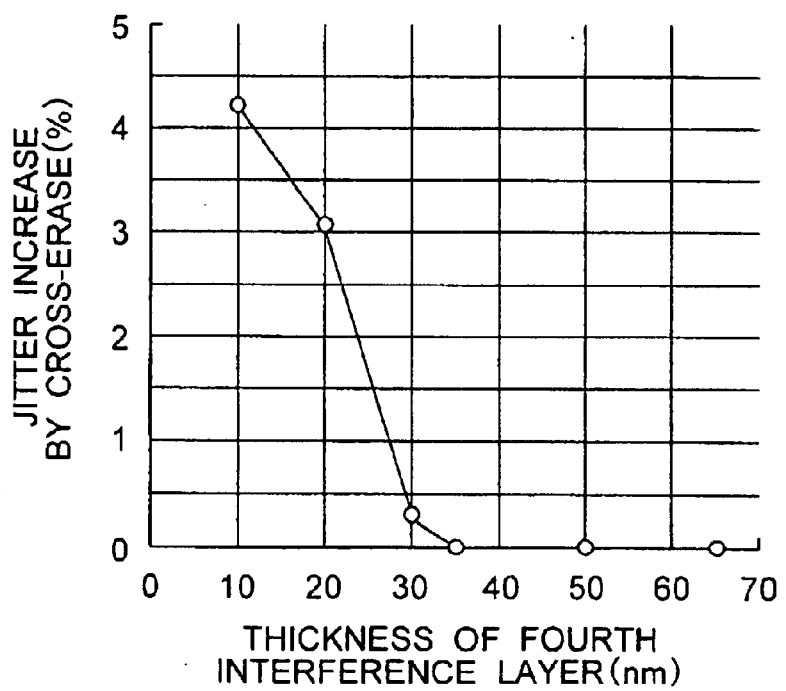
FIG. 14 is a graph showing the relation between a film thickness of a third interference layer used in the present invention and a jitter increase by over-write.

FIG. 14 shows the relation between the jitter increase by over-write and the film thickness of the third interference layer when the film thickness of the third interference layer of the optical disk A is changed. In this instance, the film thickness of the first interference layer is optimized so that the degree of modulation remains constant. The jitter increase by over-write is measured when the mark is recorded in advance to the groove and over-write is made 1,000 times to the adjacent tracks (lands) and this mark is reproduced. (The influence of cross-erase becomes smaller when the land and the groove are reversed in this experiment.) When the film thickness of the third interference layer is greater than 35 nm (when the sum of the film thickness of the third interference layer, the second interface layer and the thermal buffer layer is greater than the groove depth of 65 nm), cross-erase does not at all occur. When the film thickness of the third interference layer is smaller than 35 nm (when the sum of the film thickness of the third interference layer, the second interface layer and the thermal buffer layer is smaller than the groove depth of 65 nm), cross-erase occurs drastically, and this film thickness is not practical.

Birefringence n, k of the thermal buffer layer may be within the range of $4<n<4.5$ and $-3.5<k<-0.5$. A material that satisfies the relation $2<n<4$ and $-3.0<k<-0.5$ is particularly preferable. Since the thermal buffer layer absorbs light, a thermally stable material is preferable, and a material having a melting point of at least 1,000° C. is preferable.

When a sulfide is added to the third interference layer, a particularly large cross-erase reducing effect can be obtained. In the case of the thermal buffer layer, the sulfide content such as ZnS is preferably smaller than at least the content of the sulfide added to the third interference layer. For, adverse influences such as the drops of the melting point, thermal conductivity and absorptivity may occur in some cases.

The composition of the thermal buffer layer preferably consists of a mixture of a metal with a metal oxide, a metal sulfide, a metal nitride or a metal carbide, and a mixture of Cr with $Cr_2O_3$ provides particularly an excellent over-write performance improving effect. More concretely, the metals for the mixtures described above are Al, Cu, Ag, Au, Pt, Pd, Co, Ti, Cr, Ni, Mg, Si, V, Ca, Fe, Zn, Zr, Nb, Mo, Rh, Sn, Sb, Te, Ta, W, Ir and Pb. Preferred examples of the metal oxides, metal sulfides, metal nitrides and metal carbides include $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $MO_2$, $WO_2$, $WO_3$, $Sc_2O_3$, $Ta_2O_5$ and $ZrO_2$. The thermal buffer layer may further use oxides of Si—O—N type materials, Si—Al—O—N type materials, Cr—O type materials such as $Cr_2O_3$ and Co—O type materials such as $Co_2O_3$ and CoO, nitrides of Si—N materials such as TaN, AlN and $Si_3N_4$, Al—Si—N type materials (such as $AlSiN_2$) and Ge—N type materials, sulfides such as ZnS, $Sb_2S_3$, CdS, $In_2S_3$, $Ga_2S_3$, GeS, $SnS_2$, PbS and $Bi_2S_3$, selenides such as $SnSe_3$, $Sb_2S_3$, CdSe, ZnSe, $In_2Se_3$, $Ga_2Se_3$, GeSe, $GeSe_2$, SnSe, PbSe and $Bi_2Se_3$, fluorides such as $CeF_3$, $MgF_2$ and $CaF_2$, or materials having compositions approximate to the materials described above.

The film thickness of the thermal buffer layer is preferably 10 to 100 nm. When the film thickness is 20 to 50 nm, a particularly excellent over-write improving effect can be obtained. When the sum of the film thickness of the third interference layer, the second interface layer and the thermal buffer layer is greater than the groove depth, the cross-erase reducing effect appears remarkably.

The thermal buffer layer has the property of absorbing light as explained previously. Therefore, the thermal buffer layer absorbs light and generates heat in the same way as the recording layer does. It is important that the absorption factor of the thermal buffer layer be greater when the recording layer is under the amorphous state than when it is under the crystalline state. When such an optical design is employed, the absorption factor Aa in the recording layer under the amorphous state can be made smaller than the absorption factor Ac in the recording layer under the crystalline state. This effect can drastically improve over-write performance. To obtain such effects, the absorption factor in the thermal buffer layer must be improved to about 30 to about 40%. The calorific value in the thermal buffer layer varies depending on whether the recording layer is under the crystalline state or under the amorphous state. In consequence, the heat flow from the recording layer to the heat sink layer varies depending on the state of the recording layer, and the jitter increase by over-write can be suppressed.

The effect described above is brought forth as the temperature rises in the thermal buffer layer and cuts off the heat flow from the recording layer to the heat sink layer. To make the most of this effect, the sum of the film thickness of the third interference layer and the thermal buffer layer is preferably greater than the level difference between the land and the groove (the groove depth on the substrate; about $\frac{1}{7}$ to about $\frac{1}{5}$ of the laser wavelength). When the sum of the film thickness of the third interference layer and the thermal buffer layer is smaller than the level difference between the land and the groove, heat that occurs at the time of recording to the recording layer transfers through the heat sink layer, and the recording mark recorded to the adjacent track is likely to be erased.

A metal or an alloy having high reflectance and high thermal conductivity is preferred for the heat sink layer. The sum of the amounts of Al, Cu, Ag, Au, Pt and Pd is preferably at least 90%. Material having a high melting point and high hardness such as Cr, Mo, W, etc, and their alloys, are preferred, too, because they can prevent degradation resulting from fluidization of the recording layer material when over-write is conducted a large number of times. Particularly when the heat sink layer contains at least 95% Al, it becomes possible to obtain an information recording medium that is economical, has high CNR, high recording sensitivity and high resistance to many times over-write and moreover has an extremely high cross-erase reducing effect. Particularly when the composition of the heat sink layer contains at least 95% Al, an information recording medium that is economical and yet has high corrosion resistance can be accomplished. Addition elements to Al are Co, Ti, Cr, Ni, Mg, Si, V, Ca, Fe, Zn, Zr, Nb, Mo, Rh, Sn, Sb, Te, Ta, W, Ir, Pb, B and C, and they are excellent in the aspect of corrosion resistance. When the addition elements are Co, Cr, Ti, Ni, Fe and Cu, a particularly high effect of improving corrosion resistance can be obtained. The film thickness of the heat sink layer is preferably from 30 to 300 nm. When the film thickness of the heat sink layer is smaller than 30 nm, heat generated in the recording layer cannot diffuse easily. Particularly when the number of times of over-write exceeds about 100,000 times, the recording layer is likely to get deteriorated, and cross-erase becomes more likely to occur. Since light transmits through the heat sink layer, the heat sink layer cannot be used easily as the reflecting layer, and the amplitude of the reproduction signal is likely to drop. When the metal(s) contained in the thermal buffer layer is the same as the metal(s) contained in the heat sink layer, a large advantage can be obtained in the aspect of production, because the same target can be used to form the films of these two layers of the thermal buffer layer and the heat sink layer. To form the film of the thermal buffer layer, sputtering is conducted by using a mixed gas such as an Ar—$O_2$ mixed gas or an Ar—$N_2$ mixed gas so that the metal element and oxygen or nitrogen are allowed to react with one another during sputtering, giving a thermal buffer layer having an appropriate refractive index. To produce the film of the heat sink layer, sputtering is conducted by using the Ar gas to give a heat sink layer of a metal having high thermal conductivity.

When the film thickness of the heat sink layer is greater than 300 nm, productivity is low, warp of the substrate, etc, occurs due to the internal stress of the heat sink layer, and recording and reproduction of information cannot be conducted accurately. The film thickness of the heat sink layer is more preferably from 70 to 150 nm because both corrosion resistance and productivity are high.

As explained above in detail, the effects of the present invention appear remarkably when the following conditions are satisfied.

(1) Thermal conductivity of the first interference layer is smaller than that of the second interference layer and the distance between the first interference layer and the recording layer is not greater than the groove depth.

(2) Refractive index of the second interference layer is greater than that of the first interference layer.

(3) The first interface layer is sandwiched between the second interference layer and the recording layer.

When the first interference layer, the second interference layer and the first interface layer are combined with one another, they can make up for the demerit inherent to each layer, and can provide an information recording medium that can satisfy altogether suppression of cross-erase, improvement of reflectance, suppression of the drop of reflectance when over-write is made a large number of times, and suppression of exfoliation detect. When a structure for suppressing cross-erase, that becomes a particular problem in high-density recording, is employed, too, the drop of reflectance, the drop of reflectance when over-write is conducted a large number of times, and exfoliation defect do not occur. Therefore, the present invention can very easily produce a high-density information recording medium.

What is claimed is:

1. An information recording medium for recording information through a change of atomic configuration and/or a change of an electron state upon irradiation of a laser beam, including:

a substrate having a groove shape of a groove depth value dg;

a recording layer having a shape reflecting said groove shape; and thin films of three layers formed of a first interference layer, a second interference layer and a first interface layer having mutually different compositions, and interposed between said substrate and said recording layer in order named from a side closer to said substrate;

said first interface layer being interposed between said second interference layer and said recording layer, and contacting with said recording layer;

wherein:

thermal conductivity of said first interference layer is lower than thermal conductivity of said second interference layer, and a refractive index of said second interference layer is smaller than refractive indices of said first interference layer and said recording layer; and a distance between said first interference layer and said recording layer is not greater than said groove depth value dg.

2. An information recording medium according to claim 1, wherein:

said first interference layer comprises a mixture of ZnS and $SiO_2$, said mixture having an amount of ZnS within the range of 50 to 95%, and when the sum of amounts of oxygen, nitrogen, sulfur and carbon in said second interference layer is X, an amount of oxygen is at least 50% of X and the sum of amounts of aluminum, silicon and magnesium is at least 70% of 1−X; and said first interface layer is interposed between said second interference layer and said recording layer, and makes contact with said recording layer, and comprises an oxide or nitride of a transition metal, a nitride of silicon and germanium, or a mixture thereof.

3. An information recording medium according to claim 1, which further includes a heat sink layer formed of a metal element on a side opposite to a contact side of said recording layer with said first interface layer, and a third interference layer interposed between said recording layer and said heat sink layer, and wherein a distance between said recording layer and said heat sink layer is greater than said groove depth value dg.

4. An information recording medium according to claim 3, wherein said third interference layer comprises a mixture of ZnS and $SiO_2$ having an amount of ZnS of 50 to 95%.

5. An information recording medium according to claim 4, which further includes a second interface layer interposed between said third interference layer and said recording layer and making contact with said recording layer, and an amount of the sulfur element of said second interface layer is smaller than that of said third interference layer.

6. An information recording medium according to claim 1, wherein information recording is conducted in the grooves and on the lands.

* * * * *